United States Patent [19]
Inokuma et al.

[11] Patent Number: 5,652,576
[45] Date of Patent: Jul. 29, 1997

[54] SWITCHING SYSTEM AND INFORMATION STORING EQUIPMENT

[75] Inventors: Yoshikatsu Inokuma; Akira Kusaba, both of Yokohama; Yusuke Yamamoto, Hiratsuka, all of Japan

[73] Assignee: Hitachi, Ltd., Tokyo, Japan

[21] Appl. No.: 515,291

[22] Filed: Aug. 15, 1995

Related U.S. Application Data

[63] Continuation of Ser. No. 80,866, Jun. 24, 1993, abandoned.

[30] Foreign Application Priority Data

Jun. 26, 1992  [JP]  Japan ................................. 4-169672

[51] Int. Cl.[6] ........................................................ H04Q 1/00
[52] U.S. Cl. ........................................................ 340/825.79
[58] Field of Search ........................ 340/825.79; 370/60, 370/60.1, 94.1; 379/88, 89, 207

[56] References Cited

U.S. PATENT DOCUMENTS

| | | | |
|---|---|---|---|
| 4,933,967 | 6/1990 | Lo et al. | 379/207 |
| 5,029,199 | 7/1991 | Jones et al. | 379/89 |
| 5,073,940 | 12/1991 | Zinser et al. | 381/47 |
| 5,177,780 | 1/1993 | Kasper et al. | 379/89 X |
| 5,193,090 | 3/1993 | Filipiak et al. | 370/94.1 |
| 5,204,858 | 4/1993 | Kinashi et al. | 370/60 |
| 5,297,137 | 3/1994 | Ofek et al. | 370/60 |

*Primary Examiner*—Edwin C. Holloway, III

[57] ABSTRACT

An information storing equipment having a plurality of storage units which store information therein, and a control unit which accommodates one or more communication circuits therein and which controls the connections between the communication circuit(s) and the plurality of storage units; the control unit comprising a detector which detects information for identifying a destination terminal of information entered via the communication circuit, and a switching unit which delivers the entered information to the specified storage unit that is determined in accordance with a content of the detected identification information for the destination terminal.

4 Claims, 27 Drawing Sheets

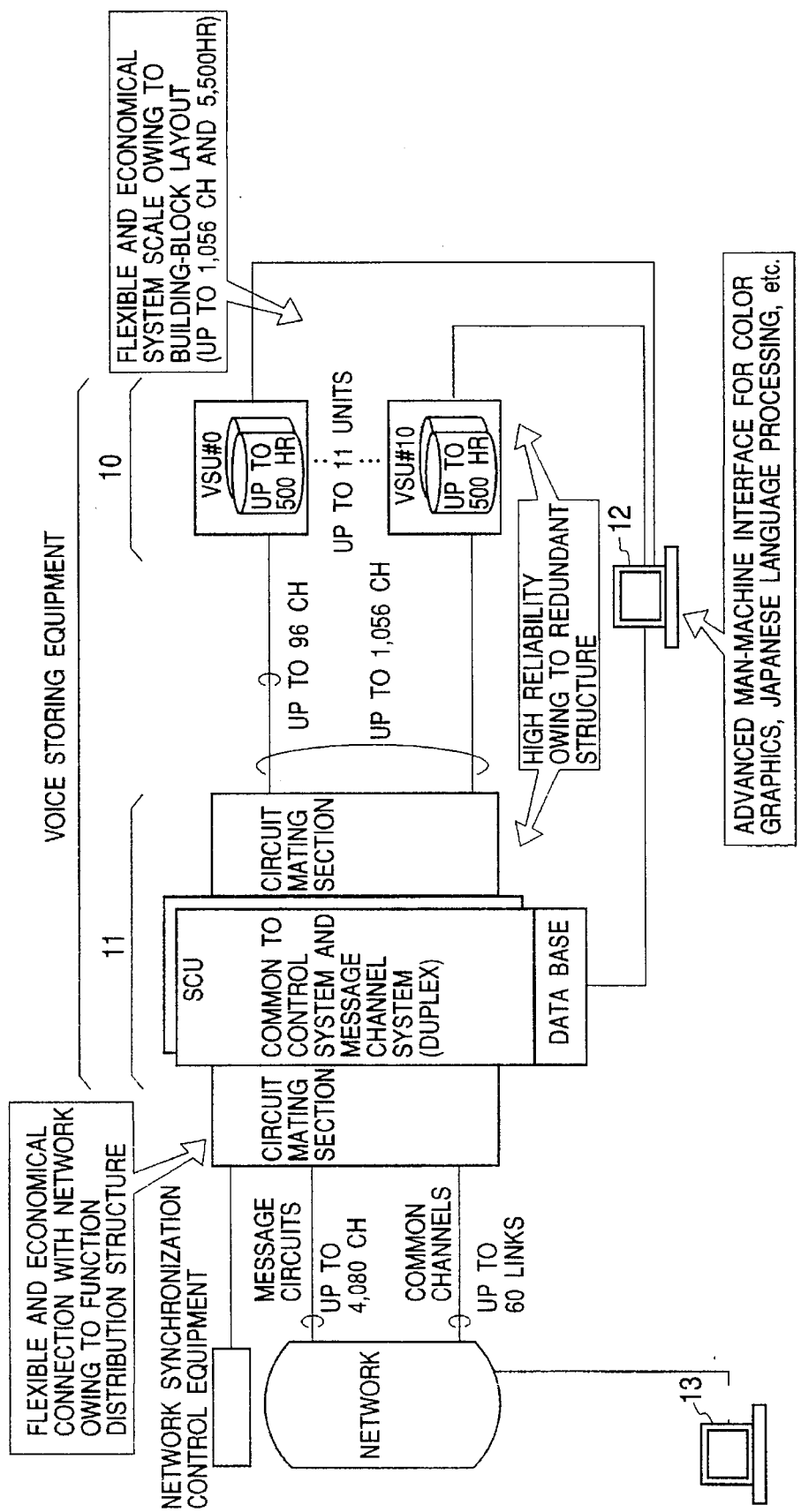

FIG. 2A

| FIG. 2 |
|---|
| FIG. 2A |
| FIG. 2B |

| ITEM NO. | | ITEM | PRODUCT SPECIFICATIONS | REMARKS |
|---|---|---|---|---|
| 1 | EQUIPMENT PROPER | NUMBER OF MESSAGE CIRCUITS | <table><tr><td></td><td>TO NETWORK</td><td>VSU</td></tr><tr><td>MIN</td><td>30 CH</td><td>8 CH</td></tr><tr><td>MAX</td><td>4080 CH</td><td>1056 CH</td></tr></table> | THE RATIO (CONCENTRATION RATIO) BETWEEN THE NUMBER OF CIRCUITS TO A NETWORK AND THE NUMBER OF CIRCUITS OF EACH VOICE STORING UNIT CAN BE FREELY SET. |
| 2 | | VOICE STORING — SIGNAL PROCESSING | 32KBPS ADPCM OR 24KBPS CVSD | 24KBPS CVSD IS RECOMMENDED. |
| | | STORAGE CAPACITY | <table><tr><td></td><td>32KBPS ADPCM</td><td>24KBPS CVSD</td></tr><tr><td>MIN STR.</td><td>190 HR</td><td>200 HR</td></tr><tr><td>MAX STR.</td><td>4000 HR</td><td>5500 HR</td></tr></table> | |
| | | REDUNDANT STR. OF MEDIUM | FULL DUPLEX | |
| 3 | | PROCESSING CAPABILITY — CPU CAPABILITY | OVER DOUBLE THE CPU CAPABILITY IN THE CASE OF CONSECUTIVE AND SIMULTANEOUS PROCESSING OF TEST CALLS FOR 1 HR. (CALL PROCESSING CAPABILITY : 90KBHCA) | TEST CALLS HOLDING TIME = 50 SEC NUMBER OF CIRCUITS = 500 CIRCUIT ACTIVITY RATE = 100% |
| | | VOICE SEARCH TIME | PROBABILITY AT WHICH A TIME PERIOD OF 3 SEC OR MORE IS EXPENDED : 1% OR BELOW | |
| | | TONE CUT-OFF PROBABILITY | $10^{-10}$ OR BELOW | |

FIG. 2B

| | | | | STANDARDS ARE CONFORMED TO. |
|---|---|---|---|---|
| | | MAINTENANCE TERMINAL INTERFACE | WITH REMOTE MAINTENANCE INTERFACE (VIA PUBLIC NETWORK OR PRIVATE LINE) | |
| 4 | EQUIPMENT PROPER | EXTERNAL IF | SIGNALING SYSTEM | COMMON CHANNEL SIGNALING |
| 5 | | | MESSAGE CHANNEL IF | |
| 6 | | EQUIPMENT CONSTRUCTION | | BUILDING-BLOCK LAYOUT |
| 7 | | MAINTENANCE AND OPERATIONS | | |
| 8 | | SOFTWARE CONDITIONS | | • VOICE STORING SERVICE APPLICATION : C LANGUAGE<br>• OS : C LANGUAGE, S-PL/H, ASSEMBLER LANGUAGE |
| 9 | MAINTENANCE TERMINAL | PROCESSING CAPABILITY | COMMAND RESPONSE TIME | WITHIN 1 SEC ON THE AVERAGE |
| | | | MULTIPROCESSING | MULTIPROCESSING BASED ON JAPANESE UNIX. MULTI-WINDOW CONTROL |
| | | | SCREEN PROCESSING FUNCTIONS | COLOR GRAPHICS DISPLAY, JAPANESE LANGUAGE PROCESSING |
| 10 | | SOFTWARE CONDITIONS | | C LANGUAGE |

FIG. 3

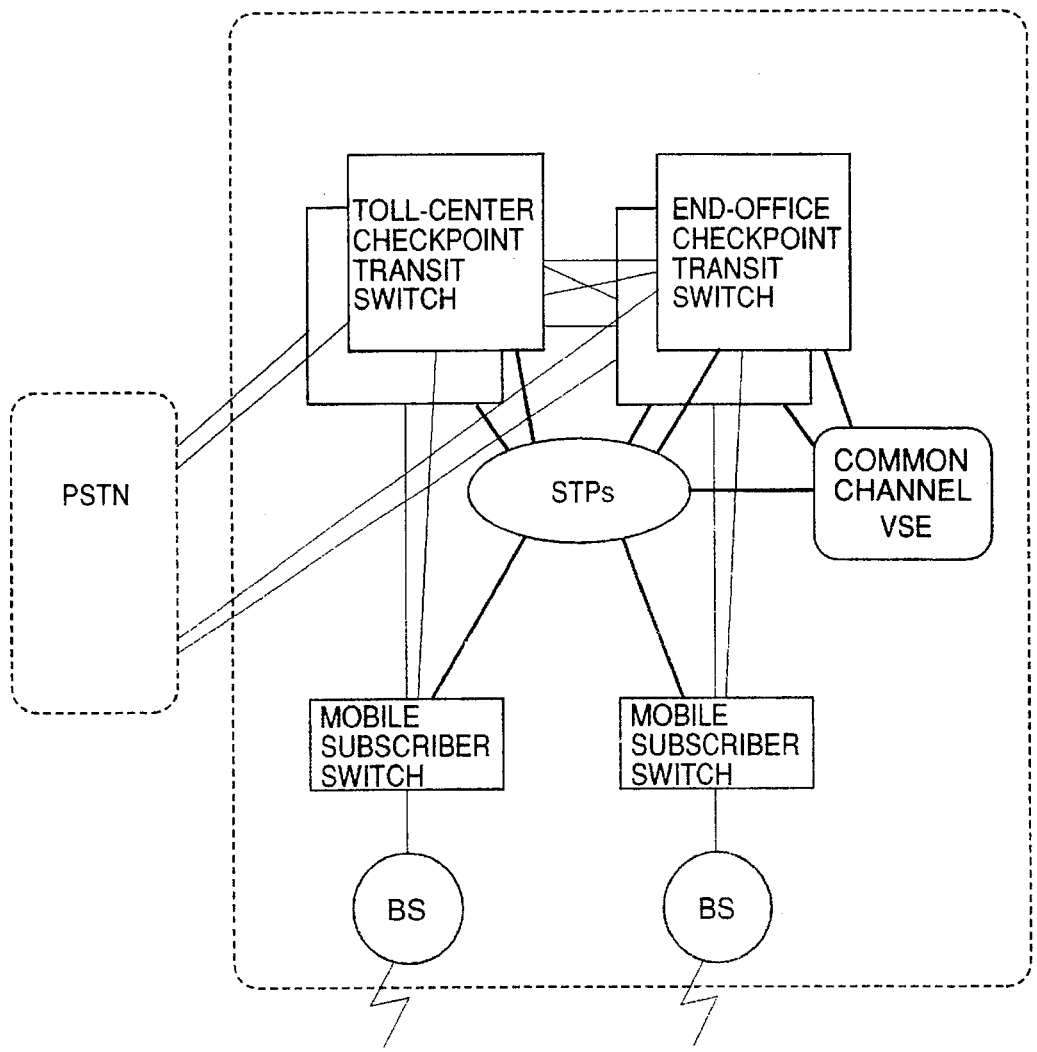

BS: BASE STATION
VSE: VOICE STORING EQUIPMENT
STP: SIGNALING TRANSFER POINTS

THE VOICE STORING EQUIPMENT (VSE) IS CONNECTED TO A TOLL-CENTER CHECKPOINT TRANSIT SWITCH. THE SIGNAL CIRCUITS OF THE VSE CONFORM TO THE COMMON CHANNEL SIGNALING SYSTEM OF A CORRESPONDING NETWORK TYPE (ANY STP IS NOT PASSED THROUGH).
IN ACTUALFACT, THE SINGLE VSE IS SOMETIMES INSTALLED IN ASSOCIATION WITH A PLURALITY OF TOLL-CENTER CHECKPOINT TRANSIT SWITCHES IN AGGREGATE FASHION.
IN THIS CASE, SIGNAL CIRCUITS ARE SET BETWEEN THE VSE AND ALL THE ASSOCIATED TOLL-CENTER CHECKPOINT TRANSIT SWITCHES, AND THEY CONFORM TO THE COMMON CHANNEL SIGNALING SYSTEM OF A QUASI-CORRESPONDING NETWORK TYPE (ANY STP IS PASSED THROUGH).

FIG.4
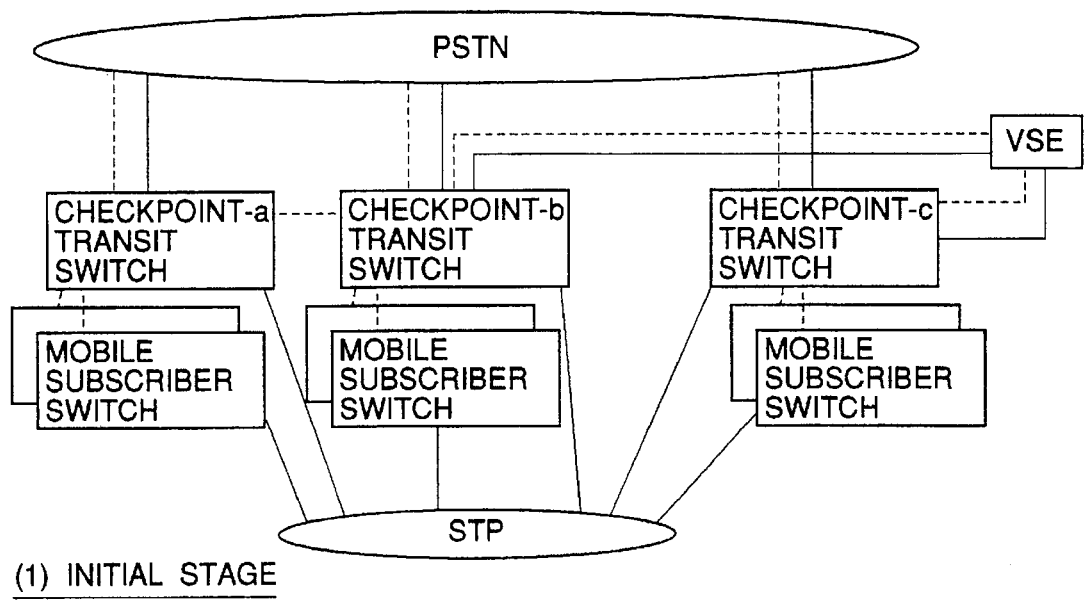
(1) INITIAL STAGE
NOTE) THE CONNECTION OF A CHECKPOINT-a TRANSIT SWITCH TO THE VSE IS RELAYED BY A CHECKPOIT-b TRANSIT SWITCH
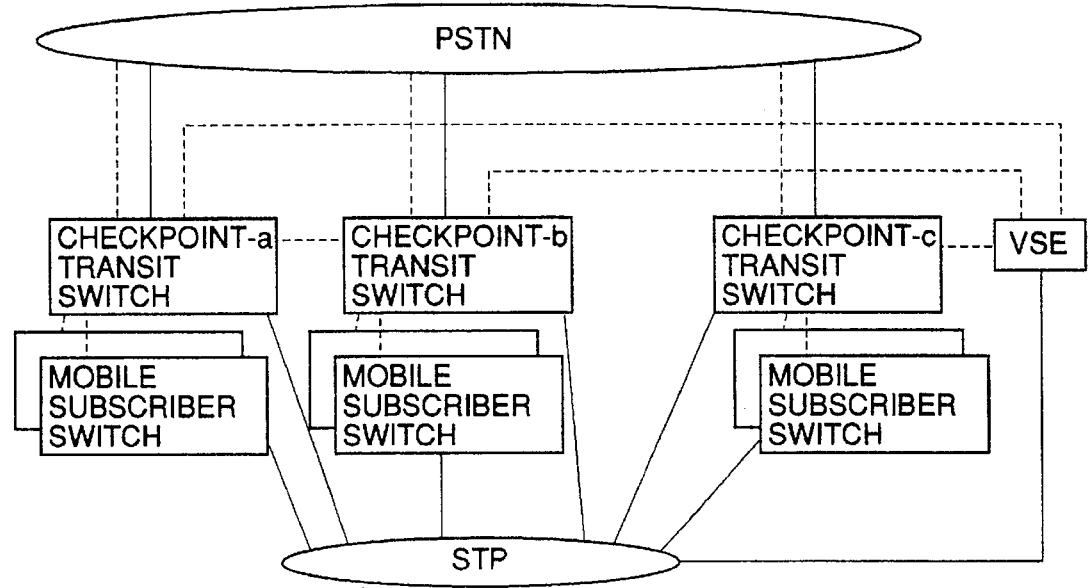
(2) REGULAR STAGE
―― : SIGNAL CIRCUIT
---- : MESSAGE CIRCUIT

FIG. 5

| NAME OF ARTICLE | OUTLINE |
| --- | --- |
| EQUIPMENT PROPER | SYSTEM CONTROL UNIT<br>• TAKING CHARGE OF THE FUNCTION OF PROCESSING COMMON CHANNEL SIGNALS FROM AND TOWARD A NETWORK, THE FUNCTION OF CONCENTRATING THE MESSAGE CIRCUIT LINES, AND THE FUNCTION OF ALLOCATING CALLS TO VOICE STORING UNITS.<br><br>• REALIZING THE ALLOCATING FUNCTION OF HIGH RELIABILITY OWING TO THE DUPLEX CONFIGURATION OF ESSENTIAL PORTIONS SUCH AS CONTROLLERS AND MESSAGE CHANNEL COMPONENTS.<br><br>VOICE STORING UNIT(S)<br>• TAKING CHARGE OF THE SERVICE FUNCTIONS OF STORING AND PLAYING BACK MESSAGES.<br>• BUILDING-BLOCK LAYOUT IN WHICH A REQUIRED NUMBER OF UNITS ARE ARRANGED IN ACCORDANCE WITH A SYSTEM SCALE.<br>• EACH UNIT REALIZES QUICK RESPONSE SERVICES OF HIGH RELIABILITY OWING TO THE ADOPTION OF THE DUPLEX CONFIGURATION OF VOICE STORING MEDIA, HIGH-SPEED PROCESSORS, AND A TRIPLE-PATH CONFIGURATION. |
| MAINTENANCE TERMINAL | • TAKING CHARGE OF A MAN-MACHINE INTERFACE FUNCTION FOR THE MAINTENANCE AND OPERATIONS OF THE EQUIPMENT PROPER.<br><br>• THE MAN-MACHINE INTERFACE FUNCTION FOR ALL THE UNITS CONSTITUTING THE VOICE STORING EQUIPMENT IS OFFERED BY THE SINGLE MAINTENANCE TERMINAL.<br><br>• REMOTE MAINTENANCE IS POSSIBLE VIA A PUBLIC NETWORK OR A DEDICATED LINE.<br><br>• OWING TO THE ADOPTION OF A GENERAL-PURPOSE WORKSTATION, THE ADVANCED MAN-MACHINE INTERFACE FOR GRAPHIC DISPLAY, JAPANESE LANGUAGE PROCESSING, ETC. IS REALIZED. |

FIG.6B

| SYMBOL | APPELLATION |
|---|---|
| CPU | CENTRAL PROCESING UNIT |
| VCU | VOICE CONTROL UNIT |
| LIC | LINE CONTROLLER |
| HD | HARD DISK |
| FD | FLOPPY DISK |
| *ACP CPU | ACP PROCESSOR |
| *ACP HD | ACP HARD DISK |
| (ACP) | (APPLICATION CONTROL PROCESSOR) |
| LIF | LINE INTERFACE |
| SSR | SIGNAL SENDER/RECEIVER |
| SGT | SIGNALING TONE TRUNK (FOR SENDING / RECEIVING PB SIGNAL / etc.) |
| COT | CENTRAL OFFICE LINE TRUNK |
| CREC | CLOCK RECEIVER |
| 2MDT | MESSAGE CIRCUIT INTERFACE DIGITAL TRUNK |
| IOC | INPUT / OUTPUT CONTROLLER |
| CC | COMMON CONTROLLER |
| MM | MAIN MEMORY |
| MSC | MAIN STORAGE CONTROL |
| HDD | HARD DISK DRIVE |
| CSE | COMMON CHANNEL SIGNALING EQUIPMENT |
| SC | SYSTEM CONTROLLER |
| BDC | BUS DATA CONTROLLER |
| FDD | FLEXIBLE DISK DRIVE |
| CLK | CLOCK GENERATOR |
| CPMI | CENTRAL PROCESSOR MODULE INTERFACE |
| DRV | DRIVER |
| iCC | IN-CHANNEL COMMUNICATION CONTROLLER |
| MIC | MODULE INTERFACE CONTROLLER |
| PTSW | TIME-DIVISION PRIMARY / TERTIARY) SWITCH |
| SREC | SECONDARY SWITCH RECEIVER |
| SSW | TIME-DIVISION SECONDARY SWITCH |
| SWMI | SWITCH MODULE INTERFACE |

FIG. 7

| ITEM. NO. | ITEM | | SPECIFICATIONS | | REMARKS |
|---|---|---|---|---|---|
| 1 | COMMON CHANNEL SIGNALING SYSTEM | | NO. 7 INTERFACE | | |
| 2 | MESSAGE CHANNEL INTERFACE | | MESSAGE CIRCUIT DIGITAL INTERFACE | | |
| 3 | CIRCUIT CAPACITY | TO NETWORK | 30~4080 CH | | |
| | | VOICE STORING UNIT | 8~1056 CH | | |
| 4 | VOICE CODING SYSTEM VOICE STORAGE TIME | | 32KBPS ADPCM | 24KBPS CVSD | EITHER CAN BE SELECTED. |
| | | | MIN 190 HR MAX 4000 HR | MIN 200 HR MAX 5500 HR | |
| 5 | REDUNDANT STRUCTURE | | DUPLEX CONFIGURATION | | VOICE DATA STORING MEDIA, AND CENTRAL PROCESSOR LOOP OF SYSTEM CONTROL UNIT. |
| 6 | MAN-MACHINE INTERFACE | | JAPANESE LANGUAGE PROCESSING AND GRAPHIC DISPLAY BY MAINTENANCE TERMINAL FUNCTIONS | | |

(UP TO 11 UNITS)

CPU : CENTRAL PROCESSING UNIT
VCU : VOICE CONTROL UNIT
LIC : LINE CONTROLLER
HD : HARD DISK
FD : FLOPPY DISK

POW : POWER UNIT
ACPCPU : ACP PROCESSOR
ACPHD : ACP HARD DISK
*ACP : APPLICATION CONTROL PROCESSOR

LINE GROUP = VOICE STORING UNIT NO.

FIG. 21A

| No. | NAME OF SERVICE | | OUTLINE OF SERVICE | VOICE STORING FEATURES | | | | | | |
|---|---|---|---|---|---|---|---|---|---|---|
| | | | | I | II | III | IV | V | VI | VII |
| 1 | MAIL BOX RECORDING SERVICE / DESTINATION SUBSCRIBER BASIS | UNKNOWN-LOCATION SUBSTITUTE RECORDING SERVICE | THE MESSAGE OF A CALLING PERSON IS STORED WHEN A CALL ARRIVES AT A SUBSCRIBER WHOSE LOCATION REGISTRATION HAS NOT BEEN UPDATED AND WHOSE CURRENT ZONE IS UNKNOWN. | ○ | − | ○ | × | ○ | × | − |
| 2 | | NO-RESPONSE SUBSTITUTE RECORDING SERVICE | THE MESSAGE OF A CALLING PERSON IS STORED WHEN A DESTINATION SUBSCRIBER HAVING BEEN CALLED DOES NOT RESPOND WITHIN A PREDETERMINED TIME PERIOD. | ○ | − | ○ | × | ○ | × | − |
| 3 | | BUSY SUBSTITUTE RECORDING SERVICE | THE MESSAGE OF A CALLING PERSON IS STORED WHEN A CALLED PERSON IS BUSY. | ○ | − | ○ | × | ○ | × | − |

I : SYSTEM PROMPT
II : INDIVIDUAL-SUBSCRIBER RESPONSE MESSAGE
III : ACKNOWLEDGEMENT OF TIME INFORMATION AFFIXATION
IV : ACCESS WITH PASSWORD NO.
V : MESSAGE CALL PRESENTATION
VI : AUTOMATIC MESSAGE ERASING
VII : LONG TIME RECORDING
○ : INDISPENSABLE   − : OPTIONAL   × : UNNECESSARY

| FIG. 21 |
|---|
| FIG. 21A |
| FIG. 21B |

FIG. 21B

| # | | Service | Description | | | | | | | |
|---|---|---|---|---|---|---|---|---|---|---|
| 4 | MAIL BOX RECORDING SERVICE / DESTINATION SUBSCRIBER BASIS | TRANSFER SUBSTITUTE RECORDING SERVICE | A MESSAGE IS SUBSTITUTIVELY STORED IN SUCH A CASE WHERE A DESTINATION SUBSCRIBER HAS REGISTERED CALL REJECTION. | ○ | — | ○ | × | ○ | × | — |
| 5 | | CALLING-SUBSCRIBER SELECTION RECORDING SERVICE | CALLS FROM SUBSCRIBERS WHOM A DESTINATION SUBSCRIBER HAS REGISTERED (OR HAS NOT REGISTERED) BEFOREHAND ARE NOT ACCEPTED, BUT THE MESSAGES THEREOF ARE SUBSTITUTIVELY STORED. | ○ | — | ○ | × | ○ | × | — |
| 6 | | PERSONAL-GREETING RESPONSE SERVICE | CALLS ARE RESPONDED TO BY A MESSAGE WHICH HAS BEEN RECORDED BY A DESTINATION SUBSCRIBER BEFOREHANDS. THIS SERVICE CAN BE COMBINED WITH THE SERVICES NOS. 1~5. | — | ○ | ○ | × | ○ | × | — |
| 7 | | MESSAGE CALL PRESENTATION SERVICE | IT IS PRESENTED TO THE DESTINATION SUBSCRIBER THAT THE MESSAGES HAVE BEEN RECORDED BY THE SERVICES NOS. 1~5. | × | × | × | × | ○ | × | × |

○ : INDISPENSABLE    — : OPTIONAL    × : UNNECESSARY

FIG. 22A

| No. | NAME OF SERVICE | | | OUTLINE OF SERVICE | VOICE STORING FEATURES | | | | | | |
|---|---|---|---|---|---|---|---|---|---|---|---|
| | | | | | I | II | III | IV | V | VI | VII |
| 8 | DESTINATION SUBSCRIBER BASIS | MAIL BOX LOGON SERVICE | MASSAGE PLAYBACK SERVICE | A RECORDED MESSAGE IS PLAYED BACK, AND HAS ITS ERASING DESIGNATED. | ○ | × | ○ | ○ | × | ○ | × |
| 9 | | | PASSWORD NO. SETTING SERVICE | A SUBSCRIBER SETS A PASSWORD NO. BY HIMSELF/HERSELF IN ORDER TO PREVENT ANOTHER PERSON FROM LOGGING ONTO HIS/HER MAIL BOX. | ○ | × | × | ○ | × | × | × |

I : SYSTEM PROMPT
II : INDIVIDUAL-SUBSCRIBER RESPONSE MESSAGE
III : ACKNOWLEDGEMENT OF TIME INFORMATION AFFIXATION
IV : ACCESS WITH PASSWORD NO.
V : MESSAGE CALL PRESENTATION
VI : AUTOMATIC MESSAGE ERASING
VII : LONG TIME RECORDING
○ : INDISPENSABLE  — : OPTIONAL  × : UNNECESSARY

| No. | | Service | Description | | | | | | | |
|---|---|---|---|---|---|---|---|---|---|---|
| 10 | MAIL BOX LOGON SERVICE / DESTINATION SUBSCRIBER BASIS | GREETING RECORDING SERVICE | GREETINGS FOR DOING A MESSAGE RESPONSE SERVICE ARE RECORDED, AND THE STOP/START THEREOF IS DESIGNATED. | × | × | × | ○ | × | × | ○ |
| 11 | SOURCE SUBSCRIBER BASIS | (NO PECULIAR SERVICE) | MESSAGE DELIVERY IS CONTAINED IN SERVICE NO.7. | | | | | | | |
| 12 | MAIL BOX LOGON SERVICE / IN SERVICE | MESSAGE MONITOR RECORDING SERVICE | MESSAGE CONTENTS ARE RECORDED IN A VOICE STORING UNIT INSTEAD OF BEING WRITTEN DOWN. | ○ | × | — | × | × | × | × |

○ : INDISPENSABLE    — : OPTIONAL    × : UNNECESSARY

FIG. 25

CORRESPONDENCE TABLE (THREE VSU'S) ①

| DESTINATION NO. (SUBSCRIBER'S ID) | OUTPUT DESTINATION (VSU NO.) |
|---|---|
| 101 | VSU 2 (FOR REMAINDER=2) |
| 150 | VSU 0 (FOR REMAINDER=0) |
| 103 | VSU 1 (FOR REMAINDER=1) |
| ⋮ | |

UNDER-EXTENSION CORRESPONDENCE TABLE (TWO EXTENSION VSU'S) ②

| DESTINATION NO. (SUBSCRIBER'S ID) | OUTPUT DESTINATION (VSU NO.) |
|---|---|
| 104 | VSU 3 (FOR REMAINDER=0) |
| 129 | VSU 4 (FOR REMAINDER=1) |
| 106 | VSU 3 |
| ⋮ | |

AFTER-EXTENSION CORRESPONDENCE TABLE (FIVE VSU'S) ③

| DESTINATION NO. (SUBSCRIBER'S ID) | OUTPUT DESTINATION (VSU NO.) |
|---|---|
| 107 | VSU 2 (FOR REMAINDER=2) |
| 108 | VSU 3 (FOR REMAINDER=3) |
| 114 | VSU 4 (FOR REMAINDER=4) |
| 110 | VSU 0 (FOR REMAINDER=0) |
| 151 | VSU 1 (FOR REMAINDER=1) |
| 120 | VSU 0 |
| 130 | VSU 0 |
| 122 | VSU 2 |
| ⋮ | ⋮ |

SWITCHING SYSTEM AND INFORMATION STORING EQUIPMENT

This application is a continuation of U.S. patent application Ser. No. 08/080,866, filed on Jun. 24, 1993.

BACKGROUND OF THE INVENTION

1. Field of the Invention

The present invention relates to a communication system, and more particularly to the system architecture and switching method thereof in the case of installing a voice storing equipment in which voice messages are stored.

2. Description of the Related Art

A conventional voice storing equipment is such that messages are temporarily stored in digital form in a memory, and the stored messages are delivered to predetermined addressees nonconcurrently as and when needed. Herein, memory areas are allotted to individual terminals, and mail boxes are disposed in correspondence with the respective terminals.

In addition, a technique disclosed in the official gazette of Japanese Patent Application Laid-open No. 149949/1991 concerns the system architecture and switching method of a communication system in the case where the number of terminals in a voice storing equipment has been increased. The system of the prior-art technique includes, at least, first and second message processing means for storing messages therein and for playing them back, and switching means for selecting one of the message processing means and for executing a routing process. The message is switched as required, and is processed by the selected message processing means.

With the prior-art technique, in order to prevent a load from concentrating on any of the plurality of message processing means, the switching means selects the message processing means as required in accordance with the load situations thereof, and the selected message processing means store calls from subscribers therein. Since, in this case, the message processing means are selected as required, the corresponding relationship between the selected message processing means and the respective subscribers needs must be stored in order to prevent them from becoming unknown. Also in the switching system of any equipment other than the voice storing equipment, the requisite is problematic in a case where, in switching output destinations for entered input calls, the input calls are to be allocated so as not to concentrate on one of the output destinations.

SUMMARY OF THE INVENTION

In order to solve the problem stated above, the present invention provides a switching system and an information storing equipment in which input calls are switched with their output routes determined automatically.

As the first expedient for the solution of the problem, the present invention relates to a switching system wherein each of input information items entered thereto is switched to a selected one of a plurality of output destinations. The switching system comprises: detection means for detecting identification information which is respectively affixed to each of the input information items; allocation means for previously stipulating an allocation procedure which allocates the output destinations of the input information items in correspondence with the identification information detected by the detection means; record means for recording a corresponding relationship between the identification information detected by the detection means and the output destinations allocated by the allocation means; decision means for deciding if the identification information detected by detection means is recorded in the record means; and switching means for delivering the each input information item to the allocated output destination; the allocation means allocating the output destination of each input information item in conformity with the allocation procedure when the decision means has decided that the detected identification information is not recorded in the record means.

The above switching system may well be so constructed that the allocation means includes holding means for endowing the plurality of output destinations with numbers beforehand, and for holding the numbers of the output destinations therein. The detection means detects identification numbers as the identification information, and the allocation means refers to the holding means and allocates the output destination endowed with the number which is equal to an evaluated value based on a predetermined evaluation function of the identification number detected by the detection means, to each input information item as the allocation procedure. The allocation means can employ a numerical value of a remainder obtained when the identification number is divided by a total number of output destinations, as the evaluated value based on the predetermined evaluation function.

As the second solving expedient, the present invention relates to an information storing equipment having a plurality of storage units which store information therein, and a control unit which is connected to at least one communication circuit for transmitting information bearing identification information of destination terminals, and which controls connections between the communication circuit and the plurality of storage units. The control unit comprises detection means for detecting the identification information of destination terminals in each of the input information items entered from the communication circuit, and switching means for delivering the input information items to a specified one of the storage units, the specified storage unit being determined in accordance with the content of the identification information of the destination terminal detected by the detection means.

In the above equipment, the switching means can include: allocation means for allocating the specified storage unit to the input information items in accordance with the content of the identification information of destination terminals detected by the detection means; output means for delivering the input information items to the allocated storage unit; record means for recording the corresponding relationship between the allocated storage units and the identification information of the destination terminals detected by the detection means; and decision means for deciding if the identification information of the destination terminal detected by the detection means is recorded in the record means. The allocation means allocates the specified storage unit to the input information items in accordance with the content of the identification information of the destination terminal detected by the detection means, when the decision means has decided that the identification information of the destination terminal is not recorded in the record means.

Besides, the switching means can further include extension detection means for detecting that the storage units have been subjected to extension work, and preferential allocation means for preferentially allocating at least one extended storage unit of the extension work to the input information items when the decision means has decided that the identification information of the destination terminal is not recorded in the record means, in a case where the extension detection means has detected the extension work of the storage units. Herein, the switching means may well include: count means for counting the number of times of those allocations to the extended storage unit which have been done by the preferential allocation means; specified-number-of-times detection means for detecting that the number of times counted by the count means has become equal to a predetermined number of times; and control means for performing a control so that a specified one of all the storage units including the extended storage unit may be allocated to the input information items by the first-mentioned allocation means, in a case where the specified-number-of-times detection means has detected the predetermined number of times of allocation. In this case, the switching means can further comprise acceptance means for accepting designation of the predetermined number of times of allocation.

In addition, the preceding equipment can be so constructed: that the detection means detects an identification number of the destination terminal as the identification information of the destination terminal; that the allocation means delivers the input information items to that one of the storage units which is endowed with a number equal to an evaluated value based on a predetermined evaluation function of the identification number detected by the detection means; and that the switching means includes extension detection means for detecting that the storage units have been subjected to an extension work. Number-of-units detection means detects the number of storage units extended in the extension work, when the extension detection means has detected the extension work. Holding means endows the extended storage units with the numbers, and holds the numbers of the extended storage units therein. Preferential allocation means allocates to the input information items that one of the extended storage units which is endowed with the number equal to the evaluated value based on the predetermined evaluation function of the identification number detected by the detection means, with reference to the holding means when the decision means has decided that the identification information of the destination terminal is not recorded in the record means, in a case where the extension detection means has detected the extension work of the storage units. Besides, the switching means can include: count means for counting a total number of times of those allocations to all the extended storage units which have been done by the preferential allocation means; specified-number-of-times detection means for setting a predetermined number of times, and for detecting that the number of times counted by the count means has become equal to the predetermined number of times; and control means for performing a control so that a specified one of all the storage units including the extended storage units may be allocated to the input information items by the first-mentioned allocation means, in a case where the specified-number-of-times detection means has detected the predetermined number of times of allocation. Also in this case, the switching means may well further comprise acceptance means for accepting designation of the predetermined number of times.

Further, the switching means can include: count means disposed in correspondence with the respective extended storage units, for counting the number of times of those allocations to the corresponding extended storage units which have been done by the preferential allocation means; specified-number-of-times detection means for setting a predetermined numbers of times in correspondence with the respective extended storage units, and for detecting that the number of times counted by any of the count means corresponding to the extended storage units has become equal to the corresponding predetermined number of times; and control means for performing a control so that a specified one of all the storage units including the extended storage units may be allocated to the input information items by the first-mentioned allocation means, in a case where the specified-number-of-times detection means has detected the predetermined number of times of allocation. Also in this case, the switching means can further comprise acceptance means for accepting designation of the predetermined numbers of times.

Besides, the information storing equipment can be so constructed that the detection means detects an identification number of the destination terminal as identification information of the destination terminal, and that the allocation means allocates to the input information items that one of the storage units which is endowed with a number equal to an evaluated value based on a predetermined evaluation function of the identification number detected by the detection means. The allocation means may well employ a numerical value of a remainder obtained when the identification number is divided by a total number of destination terminals, as the evaluated value based on the predetermined evaluation function.

Further, as the third solving expedient, the object can be accomplished by a switching method for a switching system wherein each of a number of input information items entered thereto is switched to a selected one of a plurality of output destinations, comprising steps of (a) entering the input information (b) detecting an identification number affixed to each input information item (c) evaluating the detected identification number on the basis of a predetermined evaluation function and (d) delivering the entered input information item to that one of the output destinations which is endowed with a number equal to an evaluated value obtained as a result of the evaluation.

The preceding switching method can further comprise steps of: (e) recording a corresponding relationship between the detected identification number and the previously given number of the output destination of the input information item after step (d), and then returning to step (a), (f) deciding if the detected identification number is recorded, with reference to the corresponding relationships between the detected identification numbers and the previously given numbers of the output destinations of the input information items, each of the corresponding relationships having been recorded at step (e), after step (b), (g) proceeding to step (c) when it has been decided at step (f) that the detected identification number is not recorded; and (h) delivering the input information items to the output destination corresponding to the detected identification number with reference to the recorded corresponding relationships, and then proceeding to step (e), when it has been decided at step (f) that the detected identification number is recorded.

Further, the method may well comprise steps of: (i) detecting that the output destinations have been subjected to an extension work for at least one output destination, and (j) preferentially delivering the input information items to the extended output destination, and then proceeding to step (e), on condition that the extension of the extended output destination has been detected at step (i), when it has been decided at step (f) that the identification number is not recorded.

Now, the operation of the first solving expedient described above will be described.

The detection means detects the identification information which is affixed to each input information item. The allocation means previously stipulates the allocation procedure which allocates the output destinations of the respective input information items as correspond to the individual identification information detected by the detection means. The record means records the corresponding relationships between the identification information detected by the detection means and the output destinations allocated by the allocation means. The decision means decides whether or not the identification information detected by the detection means is recorded in the record means. When the decision means has decided that the detected identification information is not recorded in the record means, the allocation means allocates the output destination of the input information items in conformity with the allocation procedure. The switching means delivers the input information items to the allocated output destination.

In the case where the allocation means includes the holding means, this holding means endows the plurality of output destinations with the numbers beforehand, and it holds the numbers of the output destinations therein. The detection means detects the identification number as the identification information. The allocation means refers to the holding means and allocates the output destination endowed with the number which is equal to the evaluated value based on the predetermined evaluation function of the identification number detected by the detection means, to each input information item as the allocation procedure. In addition, the allocation means can employ the numerical value of the remainder obtained when the identification number is divided by the total number of the output destinations, as the evaluated value based on the predetermined evaluation function.

The second solving expedient operates as described below.

In the control unit of the information storing equipment, the detection means detects the particular identification information of the destination terminal, which is contained in the input information item entered from the communication circuit. The decision means of the switching means decides whether or not the detected identification information of the destination terminal is recorded in the record means. When the decision means has decided that the identification information of the destination terminal is not recorded, the allocation means allocates the specified storage unit in accordance with the content of the detected identification information of the destination terminal, and the input information item is delivered to the allocated storage unit by the output means.

Regarding the method of the allocation, the detection means detects the identification number as the identification information, and the allocation means delivers the input information item to the storage unit being the output destination which is endowed with the number equal to the evaluated value based on the predetermined evaluation function of the identification number of the input. As one example of the predetermined evaluation function, the numerical value of the remainder obtained when the identification number of the input is divided by the total number of the output destinations is stipulated as the pertinent output destination. Besides, when the storage units have been subjected to the extension work, it can be stipulated by the allocation means that the extended storage unit is allocated in preference to the existing storage units. When the decision means has decided that the identification information of the destination terminal is not recorded, the allocation means allocates the extended storage unit as the output destination the predetermined number of times after the extension work of the storage units, whereby the extended storage unit can be allocated in preference to the existing storage units. Further, after the extended storage unit has been allocated the predetermined number of times, it is possible to stipulate that all the storage units including the extended storage unit are allocated.

BRIEF DESCRIPTION OF THE DRAWINGS

FIG. 1 is a diagram showing the architecture of a system which includes a voice storing equipment;

FIG. 2 is a diagram showing the relationship of FIGS. 2A and 2B which, taken together, are a table for explaining the specifications of the operating characteristics of the functions of the voice storing equipment;

FIG. 3 is a block diagram showing the connection of the voice storing equipment to a network;

FIG. 4 is a block diagram for explaining the progress of a network architecture;

FIG. 5 is a table for explaining the outlines of the constituents of the voice storing equipment;

FIG. 6B is a table of appellation of the symbol in FIG. 6A;

FIG. 7 is a table for explaining the specifications of the voice storing equipment;

FIGS. 21 and 22 are diagrams showing the relationship of FIGS. 21A and 21B and FIGS. 22A and 22B which, taken together, are tables for explaining the services of the voice storing system;

FIG. 25 is a diagram showing the tables of the corresponding relationships between destination numbers and output destinations.

PREFERRED EMBODIMENTS OF THE INVENTION

Figure 6A:
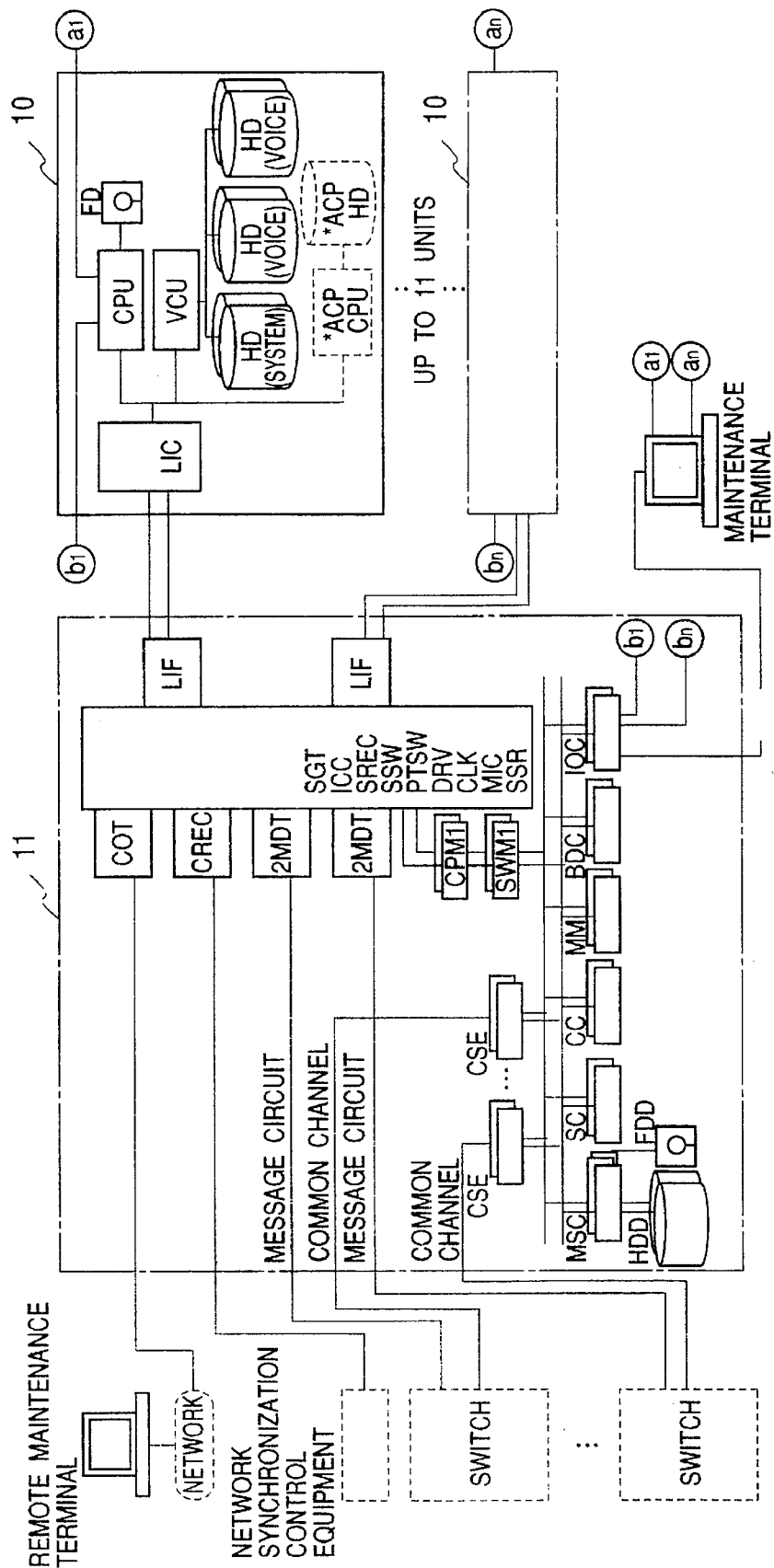
FIG. 6A is a block diagram of the voice storing system.

Now, the present invention will be described with reference to the accompanying drawings. The system architecture of a voice storing system will be first explained, followed by the switching method of the system, the method of the transfer between storage units in the system, and the various services of the system.

FIG. 1 illustrates the system architecture of the voice storing system embodying the present invention, while FIGS. 2A and 2B list the specifications of the operating characteristics of the various functions of a voice storing equipment in the embodiment.

Referring to FIG. 1, the voice storing equipment (VSE) comprises one or more voice storing units (VSU's) 10 being the storage units which store information therein, and a system control unit (SCU) 11 being a control unit to which input information items from terminals are entered and which controls the connections of message circuits to the voice storing units 10. Further, the equipment comprises a maintenance terminal 12 which includes an input portion for accepting inputs giving instructions to the system control unit 11. Any of a general-purpose workstation, a personal computer, etc. can be used as the maintenance terminal 12, and an advanced man-machine interface for color graphics, Japanese language processing, remote maintenance, etc. can be realized. The system control unit 11 includes as its external interfaces, a common channel interface and a message channel interface which are connected to another switch or exchange in a network. In addition, it includes a remote maintenance interface for remote maintenance and can have a maintenance terminal 13 connected thereto through a public network or a private line. A private branch exchange which has the switching function of concentrating and distributing lines may well be used as the system control unit 11. The voice storing unit 10 converts the voice signal of the input into a digital value by such signal processing as ADPCM (Adaptive Differential Pulse-Code Modulation) or CVSD (Continuously Variable Slope Delta Modulation), and stores the digital value therein. Besides, the digital signal of any information other than voice may well be stored in the voice storing unit 10. The voice storing unit 10 can employ a duplex redundant structure. Thus, a high reliability can be attained by storing the input information items in both of the voice storing units 10 which form the duplex configuration.

In this embodiment, the functions of concentrating/distributing the message circuits and the functions of voice storing services are distributed or separated, so that the voice storing equipment can be connected with the network economically and flexibly. Moreover, the voice storing units 10 are configured in a so called building-block or modular layout, so that the system can be economically constructed in compliance with any required storage capacity from a small capacity to a large one.

The performances, etc. of the voice storing equipment proper, etc. are as indicated in FIGS. 2A and 2B.

Next, the forms of the connections of the voice storing equipment with other switches in the network will be explained.

The common-channel signal circuits of the voice storing equipment VSE and those of any other switch in the network, such as a mobile-communication transit switch, are connected in such a way that the common-channel signal circuits are provided in correspondence with the respective message circuits as shown by the connection form of a network architecture in FIG. 3. FIG. 4 illustrates the form of that progress of a network architecture which is attendant upon increase in the traffic of the voice storing services. Referring to FIG. 4, the network architecture at an initial stage is such that the message circuits and the signal circuits are respectively provided for a plurality of specified switches. When the voice storing service traffic has increased, the signal circuits can be connected through a signaling transfer point (STP) in accordance with the expansion of the mobile-communication transit switches which are subjects for the circuit connections.

Figure 8:
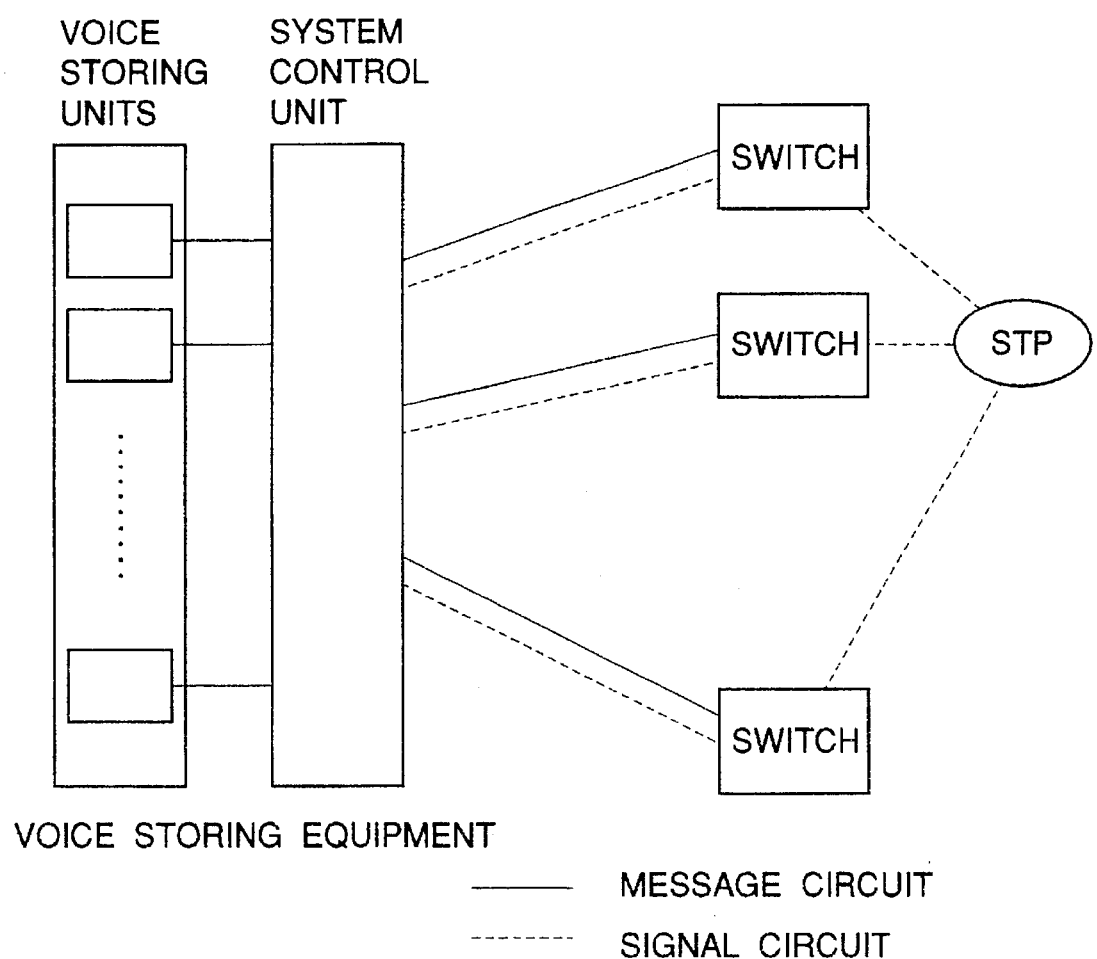
FIG. 8 is a diagram showing a network architecture.
Figure 9:
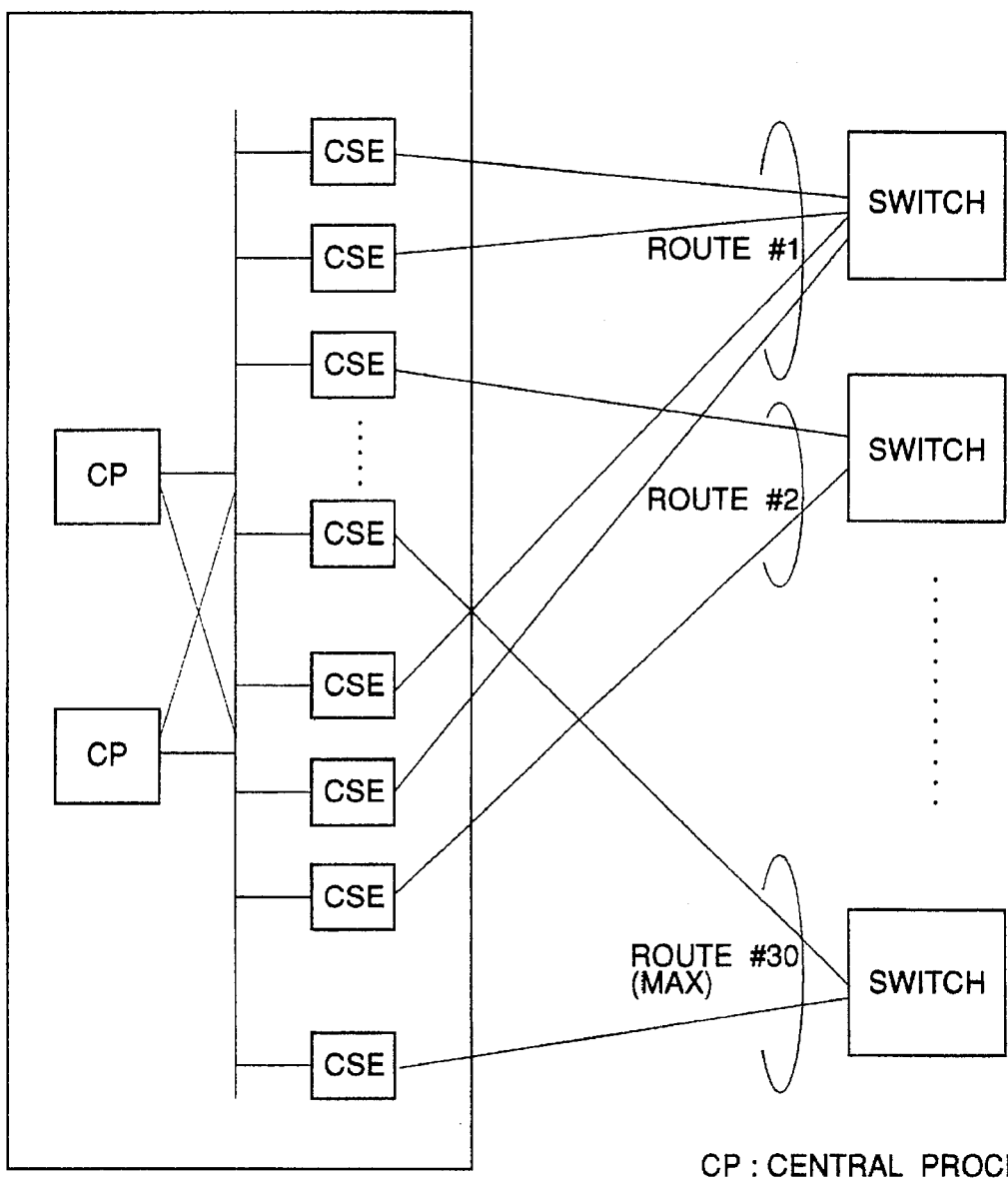
FIG. 9 is a diagram for explaining the load distribution of signal circuits.

FIGS. 5 and 7 list the specifications of the system control unit 11, the voice storing unit 10, etc., and they are self-explanatory. FIG. 6A illustrates the detailed constructions of the units 10 and 11. Further, FIGS. 8 and 9 illustrate the aspects of the connections of the voice storing equipment.

Referring to FIG. 6A, in order to connect the voice storing equipment to the other switches of the network, the system control unit 11 includes one or more message channel interfaces 2MDT for connecting the message circuits, and one or more common channel signaling equipment CSE for connecting the common channel signal circuits which conform to the No. 7 common channel signaling system of the CCITT standards. In connecting the system control unit 11 with the other switches, point-to-point connections as shown in FIG. 8 are done by considering that no influence is exerted on any existent signaling network, and that protocol processing adapted to mitigate the overhead of signal transfer can be realized. Herein, the signal circuits are set in correspondence with the message circuits. Besides, as shown in FIG. 9, a bundle of incoming signal circuits from an opposing switch shall be called a route or a path direction. Then, 30 routes can be accommodated in the whole system, and up to 8 signal circuits can be accommodated in one route. For preventing an extraordinary delay in the common-channel signal transfer, it is desirable to assign one signal circuit to about 140 message circuits. In addition, a backup signal circuit need not be provided due to the redundant structure. That is, even when any of the plurality of signal circuits disposed in load distribution fashion has broken down, the traffic can be carried by the other signal circuits. Regarding the controls of common channel signals, the controls of Level 1 and Level 2 are performed by the common channel signaling interfaces CSIF and common channel signaling equipment CSE which are disposed in correspondence with respective signal links, and Level 3 and Level 4 are handled by common controllers CC. As the signal transmission rate of Level 1, either 4.8 [Kb/s] or 48 [Kb/s] can be selected in conformity with CCITT Standard JT-Q702, and the common channel signals can be transmitted to and received from a transmitter side at a bearer rate of 64 [Kb/s] in terms of the digital signals. A signal form employed is the (6+2) envelope form with the F bit and the S bit fixed to '0' and '1', respectively. The CMI (coded mark inversion) can be employed for coding, and a cable for use can be a TD (time-division) bus cable. The signal links have their usable/unusable states managed. Herein, the unusable state is distinguished as to whether the link is faulty or it is at a stop based on a request made by a test/maintenance system. When a signaling network function has received information on the abnormality (excessive error rate or excessive response delay) of any link from a lower level (signal link function), it brings the corresponding signal link into the unusable state and reports the prohibition of use of the abnormal link to an upper level. Thereafter, the signaling network function can carry a requested traffic by the use of another signal link until it is notified of the restoration of the unusable link by the lower level. As the function of an ISDN (integrated service digital network) user portion, an ISDN user portion which conforms to the No. 7 common channel signaling system of the CCITT standards can be fundamentally applied to a call control interface for the connections between the voice storing equipment and the switch.

Figure 11:
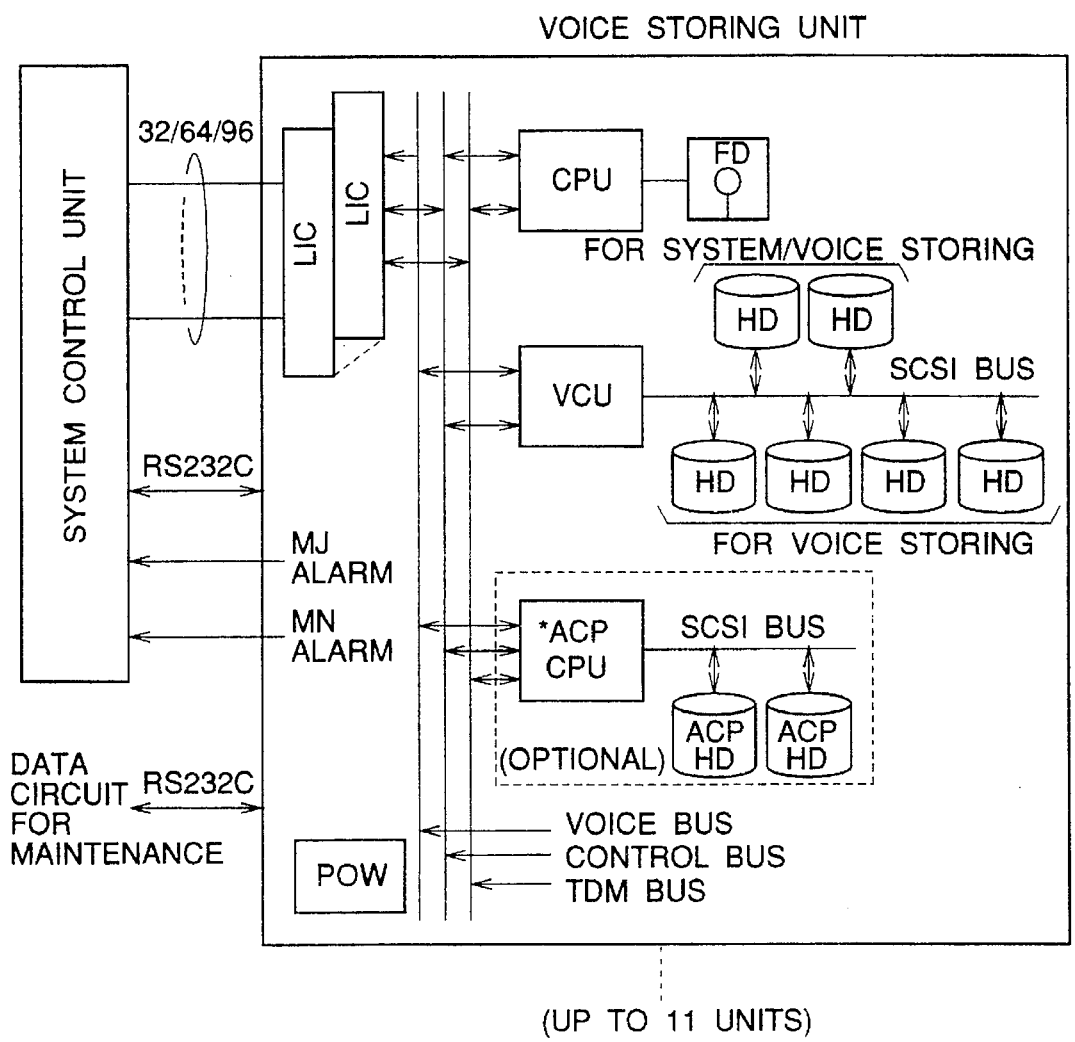
FIG. 11 is a diagram showing the construction of a voice storing unit which is one of the constituents of the voice storing equipment.

FIG. 11 is a block diagram showing the construction of the voice storing unit 10. Referring to the figure, any of up to 32, 64 and 96 circuits per unit can be selected as the number of the message circuits of the voice storing unit (VSU) 10. In addition, the system control unit (SCU) 11 can deal with up to 11 VSU's. Accordingly, the voice storing equipment can accommodate up to 1,056 message circuits. The message circuits which are connected with the switches in the network can be accommodated up to 4,080 channels by the use of the digital trunks (DT). The system control unit (SCU) 11 can accommodate the 60 common channel signal links as the maximum capacity. Accordingly, in the case where the common channel signal links are duplex, up to 30 opposing connections are possible. As a mail box capacity (the number of voice message subscribers), up to 20,000 mail boxes can be registered per voice storing unit (VSU) 10. Accordingly, up to 220,000 mail boxes can be registered using the 11 VSU's. The system control unit (SCU) 11 is therefore adapted for the conversions between up to 220,000 subscribers' numbers and mail box numbers.

The voice storing unit 10 includes storage means such as hard disks (HD). Voices are stored as digitized data in the hard disks built into the voice storing unit 10. The CVSD system of 24 [Kbps] affords a storage capacity of up to 500 hours per unit, so that voice data of up to 5,500 hours in length can be stored with the 11 units. In the voice storing system of this embodiment, a parallel operation mode based on the plurality of voice storing units 10 is adopted, and the voice storing hard disks (HD) are completely duplexed within each unit 10. Further, the system can optimize the data storing operation on the basis of the deletion of silent parts, and it can implement the 24 [Kbps] CVSD voice signal processing and an automatic gain control function.

Figure 12:
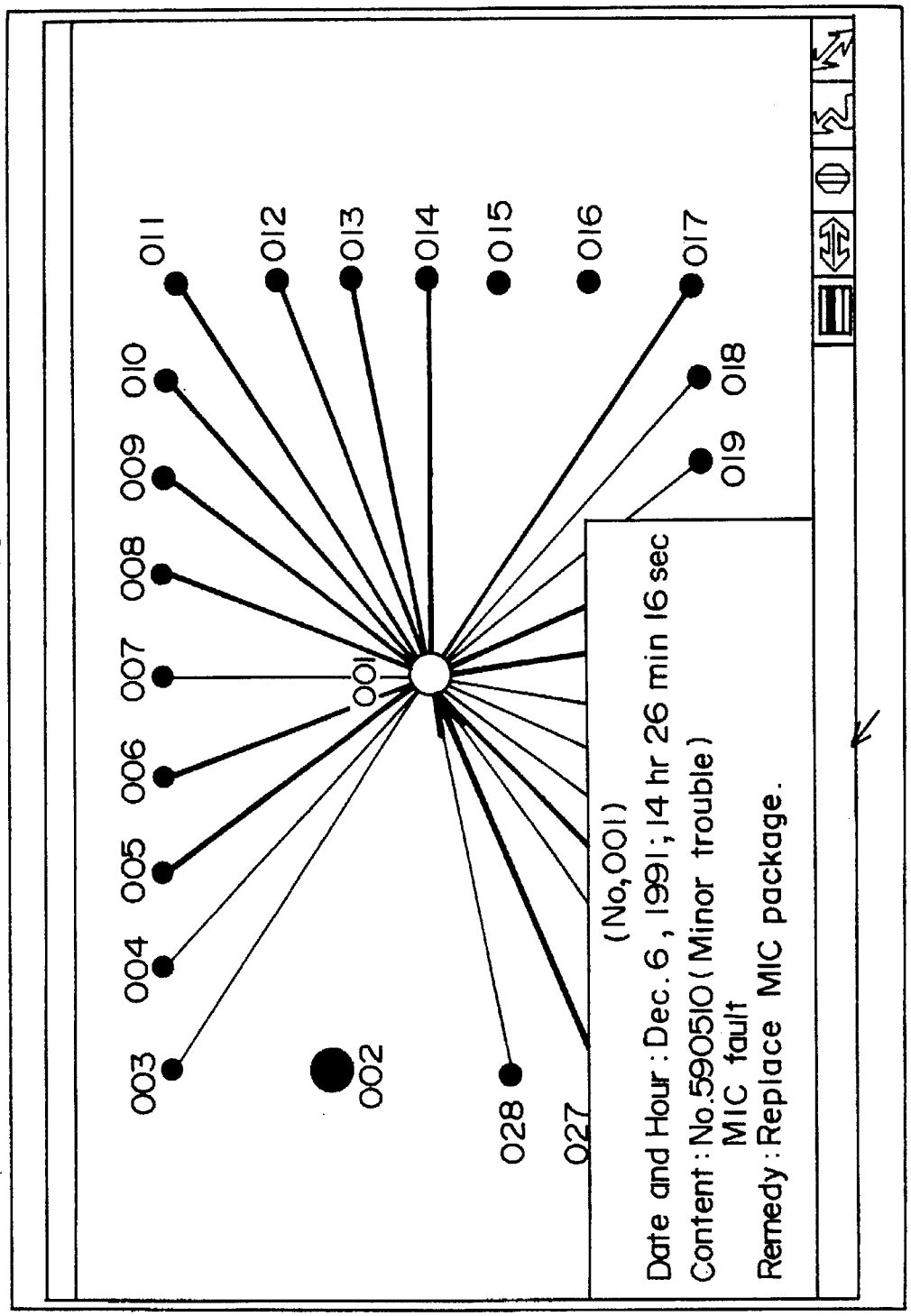
FIG. 12 is a diagram showing the display screen of the situation of the uses of circuits.

The maintenance terminal 12 can have its interface connected with the system control unit 11 by an interface conforming to the recommended standard RS232-C, and can also perform remote maintenance by the use of the public network or the private line through a modem. In addition, the communication rate between the system control unit 11 and the maintenance terminal 12 can be selected between 300 [bps] and 4,800 [bps] inclusive. The maintenance terminal 12 has such maintenance functions as updating files and setting office conditions. In a case where the system control unit (SCU) 11 is engaged in updating the file, a service interruption time can be shortened by utilizing a spare equipment. In work for extending or taking away the network side interfaces (trunks) or voice storing unit interfaces of the system control unit 11, office data can be altered by sending commands from the maintenance terminal 12 without stopping the system. Further, the maintenance terminal 12 can display the situation of the uses of the circuits, etc. as shown by a display screen in FIG. 12.

Next, the switching method in the system control unit 11 will be explained. In this embodiment, the plurality of voice storing units 10 are installed in the building-block or modular layout, thereby making it possible to cope with extensive applications from a small storage capacity to a large storage capacity. In the system control unit 11, therefore, a routing function becomes important depending on which of the voice storing units 10 is to be selected for connection. The routing function is governed by an algorithm which allocates the voice storing unit 10 to the first call of a new subscriber. In allocating the mail box to the new subscriber, this embodiment employs the algorithm in which the voice storing unit number is uniquely obtained from the subscriber's number. Hereinbelow, this algorithm shall be termed the "fixed allocation mode". The fixed allocation mode is implemented as follows: In an information storing equipment having a plurality of voice storing units as storage units which store information therein; and a system control unit as a control unit which is connected to at least one communication circuit for transmitting information bearing identification information of destination terminals, and which controls connections between the communication circuit and the plurality of storage units; the control unit comprises detection means for detecting the identification information of the destination terminals in each input information item entered from the communication circuit; and switching means for delivering the input information items to a specified one of the storage units, the specified storage unit being determined in accordance with a content of the identification information of the destination terminal detected by the detection means. Herein, the switching means includes allocation means for allocating the specified storage unit to the input information items in accordance with the content of the identification information of the destination terminal detected by the detection means; output means for delivering the input information items to the allocated storage unit; record means for recording corresponding relationships between the allocated storage units and the identification information of the destination terminals detected by the detection means; and decision means for deciding whether or not the identification information of the destination terminal detected by the detection means is recorded in the record means; the allocation means allocating the specified storage unit to the input information items in accordance with the content of the identification information of the destination terminal detected by the detection means, when the decision means has decided that the identification information of the destination terminal is not recorded in the record means. The destination terminals mentioned above are the information transmitting/receiving terminals of telephony etc., and are respectively endowed with the identification numbers beforehand. The detection means detects each of the identification numbers, e.g., subscriber's numbers as the identification information, while the allocation means allots the identification numbers to the voice storing units of the output destinations in advance and stipulates the voice storing units in correspondence with the identification numbers of the inputs. Thus, the input information items can be delivered to the voice storing unit of the output destination fixedly or uniquely in accordance with the destination information affixed to the input information items theirselves. Besides, the switching means can further include extension detection means for detecting that the storage units have been subjected to an extension work; and preferential allocation means for preferentially allocating at least one extended storage unit of the extension work to the input information items when the decision means has decided that the identification information of the destination terminal is not recorded in the record means, in a case where the extension detection means has detected the extension work of the storage units.

As one example of the fixed allocation mode, a case where the numerical value of a remainder obtained by dividing the identification (ID) number of the input by the total number of output destinations is stipulated as the identification number of the voice storing unit 10 will be explained below with reference to FIG. 14. By the way, the information to be stored in the record means are exemplified in FIG. 25. In the example of FIG. 25, the record means is constituted by correspondence tables, each of which stores therein the destination numbers (subscribers' ID numbers) being the identification information and the identification numbers of the voice storing units (VSU) being the output destinations.

Figure 14:
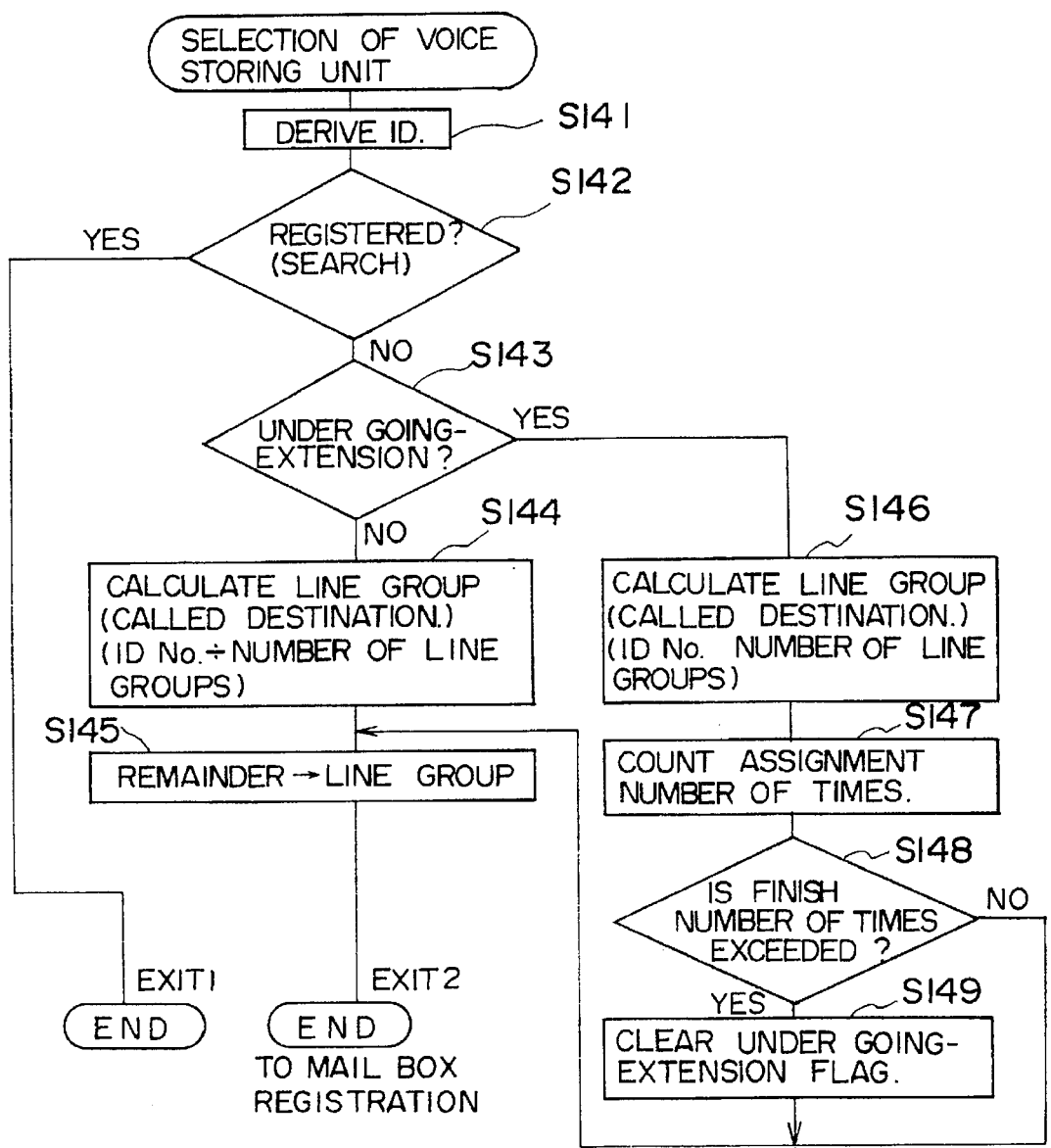
FIG. 14 is a flow chart of a sequence for selecting any of the voice storing units.

Referring to FIG. 14, when a call has been entered into the voice storing equipment through the message circuit as well as the common channel, the detection means detects the identification information (subscriber's ID number) of the call (at a step S141). Subsequently, the decision means decides whether or not the identification number of the terminal of the input information item of the call is registered in the record means (S142). If the terminal identification number is registered, the output means delivers the input information item to the voice storing unit corresponding to the identification information registered in the record means. In contrast, if the terminal identification number is not registered, the extension detection means decides whether or not the voice storing units are undergoing the extension work (for increasing the number of the units) (S143). Unless the voice storing units are undergoing the extension work, the allocation means calculates the VSU number from the identification number of the terminal of the input information item (S144). The numerical value of the remainder, which is obtained by dividing the ID number of the input by the total number of voice storing units being the output destinations, is set as the VSU number being the output destination of the input, and it is registered in the record means (S145). In this manner, the output destination can be fixedly allocated by the predetermined allocation method.

On the other hand, if the voice storing units are undergoing the extension work, each voice storing unit extended by the extension work can be preferentially allocated as the output destination. By way of example, it is possible to assign the extended voice storing unit as the output destination a predetermined number of times, and to distribute the output destinations among all the voice storing units (including the extended unit) after the extended unit has been assigned the predetermined number of times. That is, the number of times for finishing the preferential assignment mode is set in advance, the number of times which the extended unit has been assigned is counted, and the ordinary allocation mode is resumed when the counted number of times has exceeded the present number of times. Whether or not the voice storing units 10 are undergoing the extension work, can be indicated by acceptance means included in the switching means of the system control unit 11. When the extension work of the voice storing units has been indicated by the acceptance means, the extension detection means detects the extension work and sets an undergoing-extension flag. In the extension work, each voice storing unit to be extended or additionally installed is endowed with a number, and the number of the storage unit to be extended is held in a holding means. In the routine of FIG. 14, on condition that the undergoing-extension flag is set, the VSU number of the output destination is calculated from the identification number of the terminal of the input information items (S146). In this case, the output destination is determined to be the extended voice storing unit whose held number is equal to the numerical value of a remainder obtained by dividing the ID number of the input by the total number of the extended voice storing units (S145). After the calculation, the total number of times which the extended voice storing unit has been assigned is counted (S147). Subsequently, the counted total number of times is compared with the previously set number of times (S148). The extended voice storing unit is allocated within the previously set number of times, whereas the undergoing-extension flag is cleared when the previously set number of times has been exceeded (S149).

Figure 13:
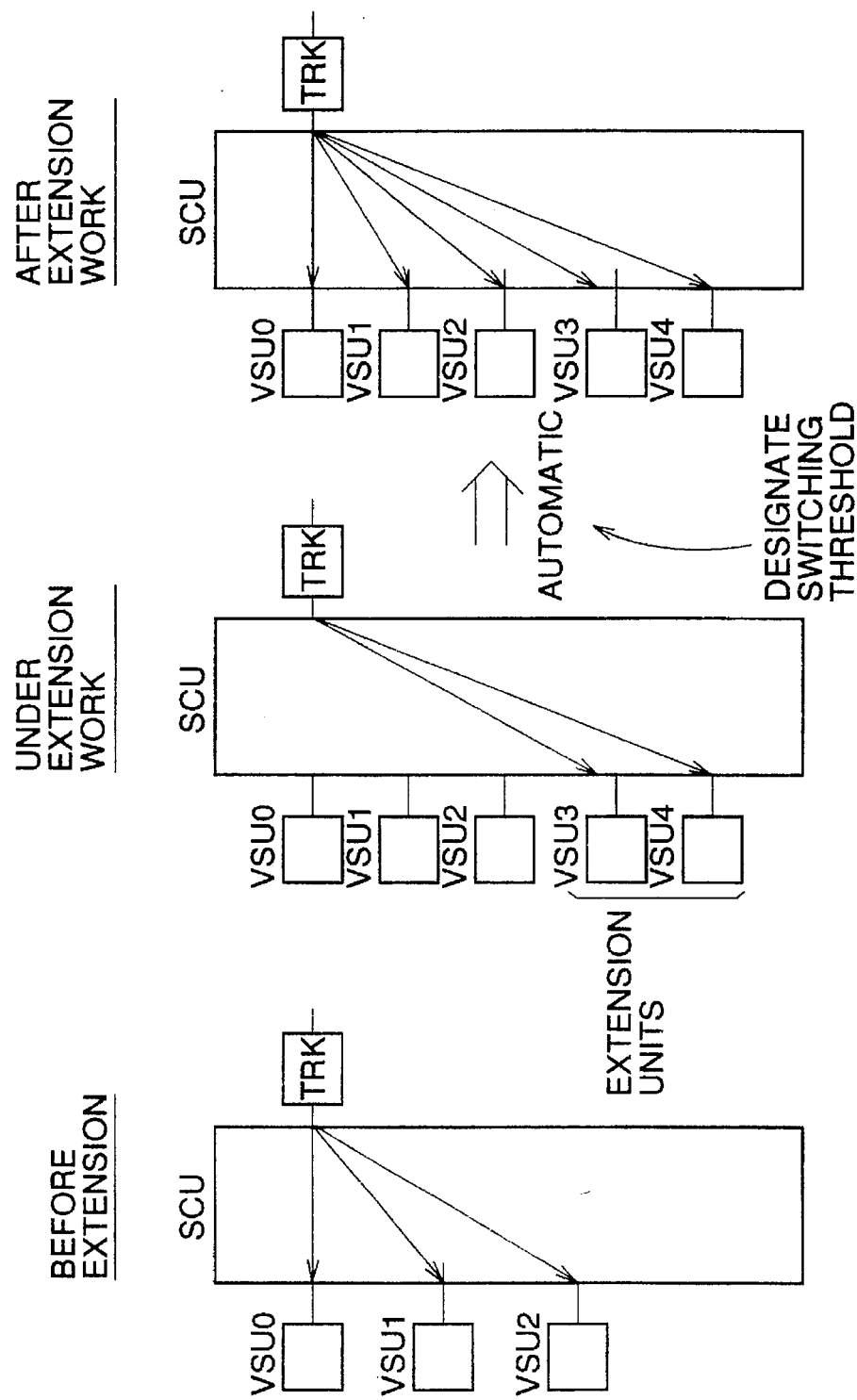
FIG. 13 is a diagram for explaining a method of selecting any of the voice storing units.

The situation of the allocation in the extension work will be explained in conjunction with FIG. 13. Referring to FIG. 13, before the extension work, the numerical value of a remainder obtained when the ID (identification) number of each input is divided by the total number 3 of the voice storing units VSU0~VSU2 being the number of the output destinations is set as the VSU number of the output destination. As tabulated by way of example in FIG. 25, the voice storing unit VSU0 corresponds to the remainder of 0 (zero) obtained when the ID number 150 is divided by 3, the unit VSU1 corresponds to the remainder of 1 (one) obtained when the ID number 103 is divided by 3, and the unit VSU2 corresponds to the remainder of 2 obtained when the ID number 101 is divided by 3. On the other hand, while the voice storing units are undergoing the extension work (for additionally installing extension units VSU3 and VSU4), the extension voice storing units are preferentially allocated as the output destinations the predetermined number of times. Since, in this case, the two voice storing units VSU3 and VSU4 are extended, extension unit number 0 (zero) (corresponding to a remainder of 0 obtained when the ID number of the input is divided by the total number 2 of the extension units VSU3 and VSU4) and number 1 (one) (corresponding to a remainder of 1 obtained when the ID number of the input is divided by the total number 2) are held for the respective extension units VSU3 and VSU4 beforehand. Thus, each extended voice storing unit, the extension unit number of which is equal to the numerical value of the remainder obtained when the ID number of the input is divided by the total number 2 of the extended voice storing units VSU3 and VSU4 being the number of the output destinations, is preferentially allocated as the output destination of the pertinent input. More concretely, as exemplified in FIG. 25, the extended voice storing unit VSU3 is allocated to the ID numbers 104 and 106 which produce the remainders of 0 (zero) when divided by the total number 2 of the extension units VSU3 and VSU4, while the extended voice storing unit VSU4 is allocated to the ID number 129 which produces the remainder of 1 (one) when divided by the total number 2. Further, after the extended voice storing units VSU3 and VSU4 have been allocated the predetermined number of times, all the voice storing units including these extended units are allocated as the output destinations similarly to the allocation before the extension work. That is, the voice storing units VSU0~VSU4 totaling five are allocated depending upon remainders of 0 (zero) thru 4, as exemplified by the after-extension correspondence table in FIG. 25. Alternatively, it is possible to take a measure in which the predetermined numbers of times of allocations are set in correspondence with the respective extended voice storing units, the numbers of times of the allocations are counted for the respective extended storage units, and specified-number-of-times detection means detects that the number of times counted by any of the count means associated with the extended storage units has become equal to the corresponding predetermined number of times. Besides, the number of the voice storing units to be extended or added in the extension work can be designated by the acceptance means, and number-of-units detection means detects the number of the extended storage units when extension detection means has detected the extension work after the designation of the number of the extension units with the acceptance means. The designation with the acceptance means may well be dispensed with in such a way that the extension detection means and the number-of-units detection means detect the extension work and the number of the extension voice storing units when these extension units have been installed in the extension work.

In this manner, the switching means includes the count means for counting the number of times of those allocations to the extended storage unit which have been done by the preferential allocation means; the specified-number-of-times detection means for detecting that the number of times counted by the count means has become equal to the predetermined number of times; and control means for performing a control so that the specified one of all the storage units including the extended storage unit or units may be allocated to the input information items by the first-mentioned allocation means, in the case where the specified-number-of-times detection means has detected the predetermined number of times of allocation. The switching means can further include the acceptance means for accepting the designation of the predetermined number of times. In addition, the switching means can further include the number-of-units detection means for detecting the number of the extension storage units when the extension detection means has detected the extension work; the holding means for endowing the extended storage units with the numbers, and for holding the numbers of the extended storage units therein; and the preferential allocation means for allocating to the input information items that particular one of the extended storage units which is endowed with the number equal to an evaluated value based on the predetermined evaluation function of the identification number detected by the detection means, with reference to the holding means when the decision means has decided that the identification information of the destination terminal is not recorded in the record means, in the case where the extension detection means has detected the extension work of the storage units. Further, the switching means can include the count means disposed in correspondence with the respective extended storage units, for counting the numbers of times of those allocations to the corresponding extended storage units which have been carried out by the preferential allocation means; the specified-number-of-times detection means for setting the predetermined numbers of times in correspondence with the respective extended storage units, and for detecting that the number of times counted by any of the count means corresponding to the extended storage units has become equal to the corresponding predetermined number of times; and the control means for performing a control so that the specified one of all the storage units including the extended storage units may be allocated to the input information items by the first-mentioned allocation means, in the case where the specified-number-of-times detection means has detected the predetermined number of times of allocation.

In this way, the load of the voice storing equipment can be distributed among the plurality of voice storing units. As another method for the fixed allocation, in a case where the voice storing units are installed in the number of 10, the numerical values of the lowest digit (or any digit) of the ID (identification) numbers of the inputs may well be assigned as the numbers of the voice storing units. Alternatively, the numerical values of any digit(s), such as one highest digit or two highest digits, of the ID numbers may well be assigned as the numbers of the voice storing units. Further, in a case where the voice storing units are installed in the number of 2, the even numbers and odd numbers of the ID numbers of the inputs can be assigned. It is also allowed to previously set an order for the voice storing units, and to allocate the voice storing units to the successive arriving inputs in the preset order. In other words, the allocation means previously stipulates an allocation procedure so that the inputs may be delivered to the output destinations which are endowed with the numbers equal to the estimated values based on the predetermined estimation functions of the ID numbers of the inputs. Besides, the individual areas of the voice storing units to be allotted to the respective inputs are determined beforehand, and the allotted areas are stored in the memory or record means. Time periods for which the inputs has been stored, password numbers, greeting messages, etc. may well be stored in the memory means. Further, information to be stored are not restricted to the voice information, but such information as video information and data can also be stored.

Figure 10:
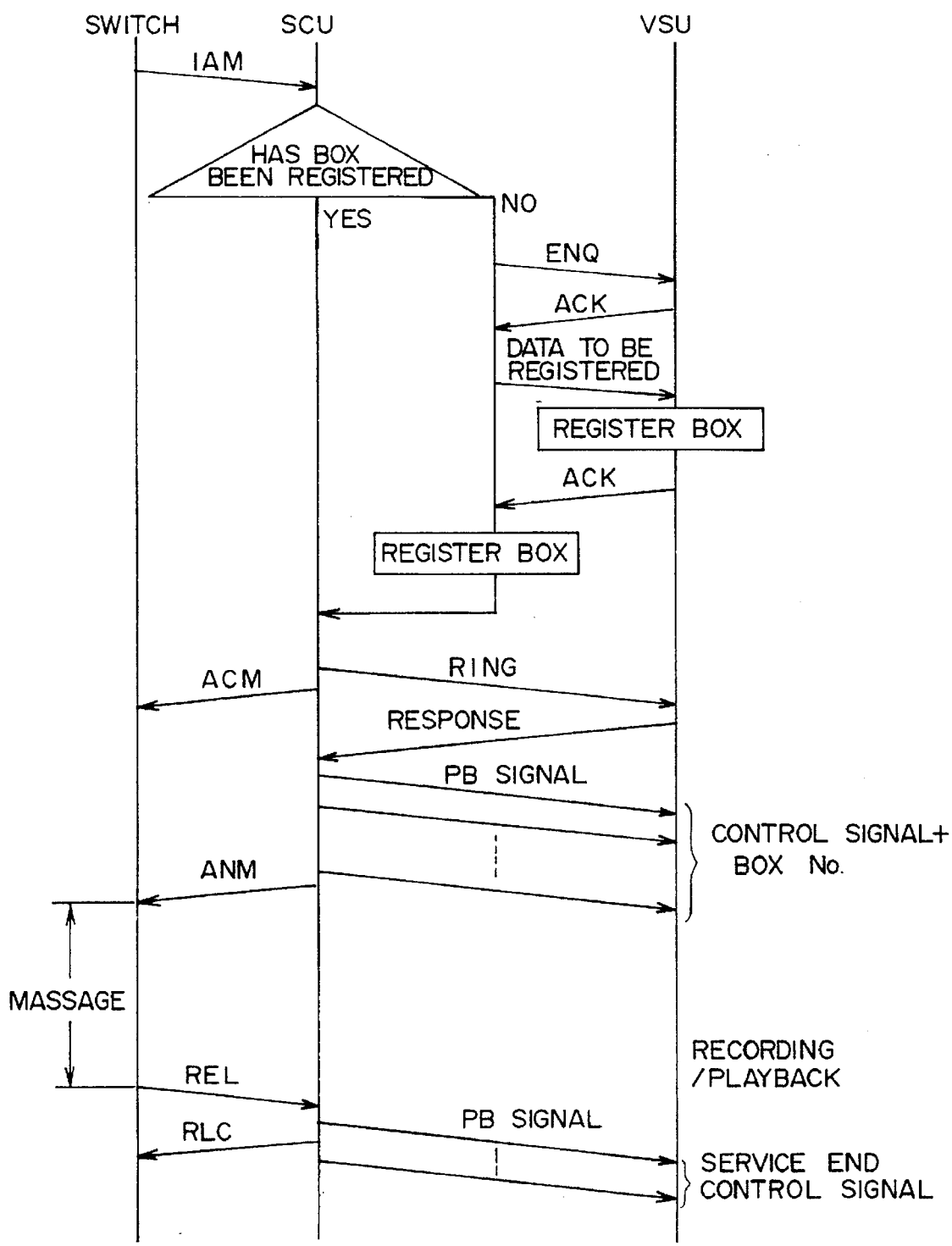
FIG. 10 is a diagram showing the signal sequence of recording/playback.

Meanwhile, a signal sequence for voice connection is shown in FIG. 10. This figure illustrates the registration of a box and the transmission/reception of signals for the recording or playback of stored voice among the switch or exchange, the system control unit 11 and the voice storing unit 10. The number of the voice storing unit or the area number thereof which is fixedly or uniquely allocated as described above is registered as a box number. After the registration, the information can be stored in the voice storing unit or the stored information can be read out therefrom by designating the service number or the like of the recording or playback with a PB (push-button) signal. Besides, a guidance may well be sent so as to facilitate the operation of the voice storing system.

Next, methods of transferring information between the storage units will be explained.

Figure 15:
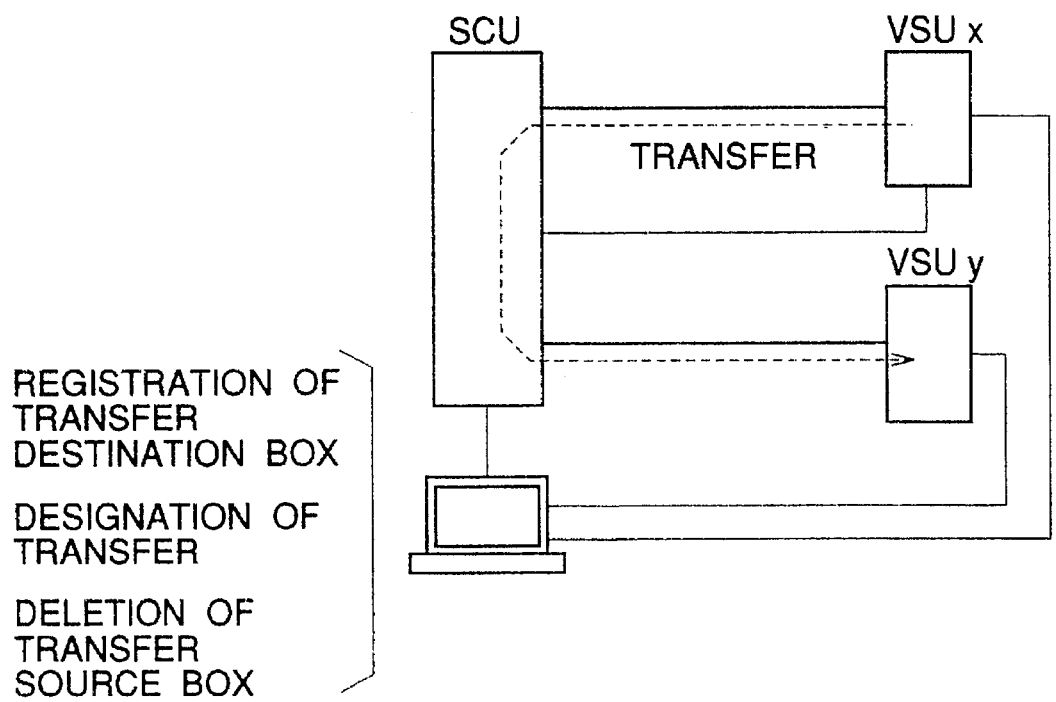
FIG. 15 is a block diagram showing that transfer of stored information between the voice storing units which is attendant upon a division within the identical system.
Figure 16:
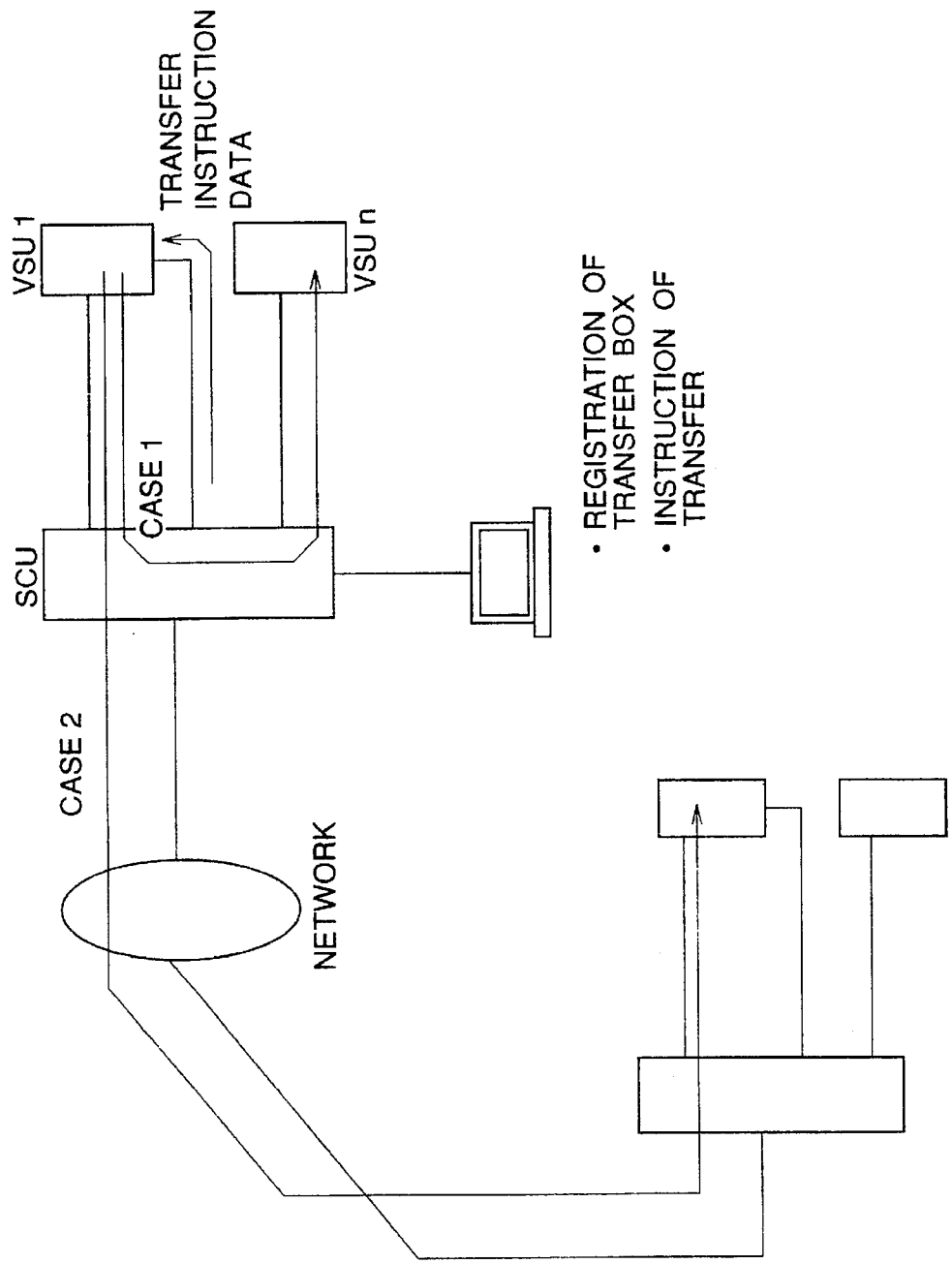
FIG. 16 is a block diagram showing that interoffice transfer of stored information which is attendant upon an extension work in another office.
Figure 23:
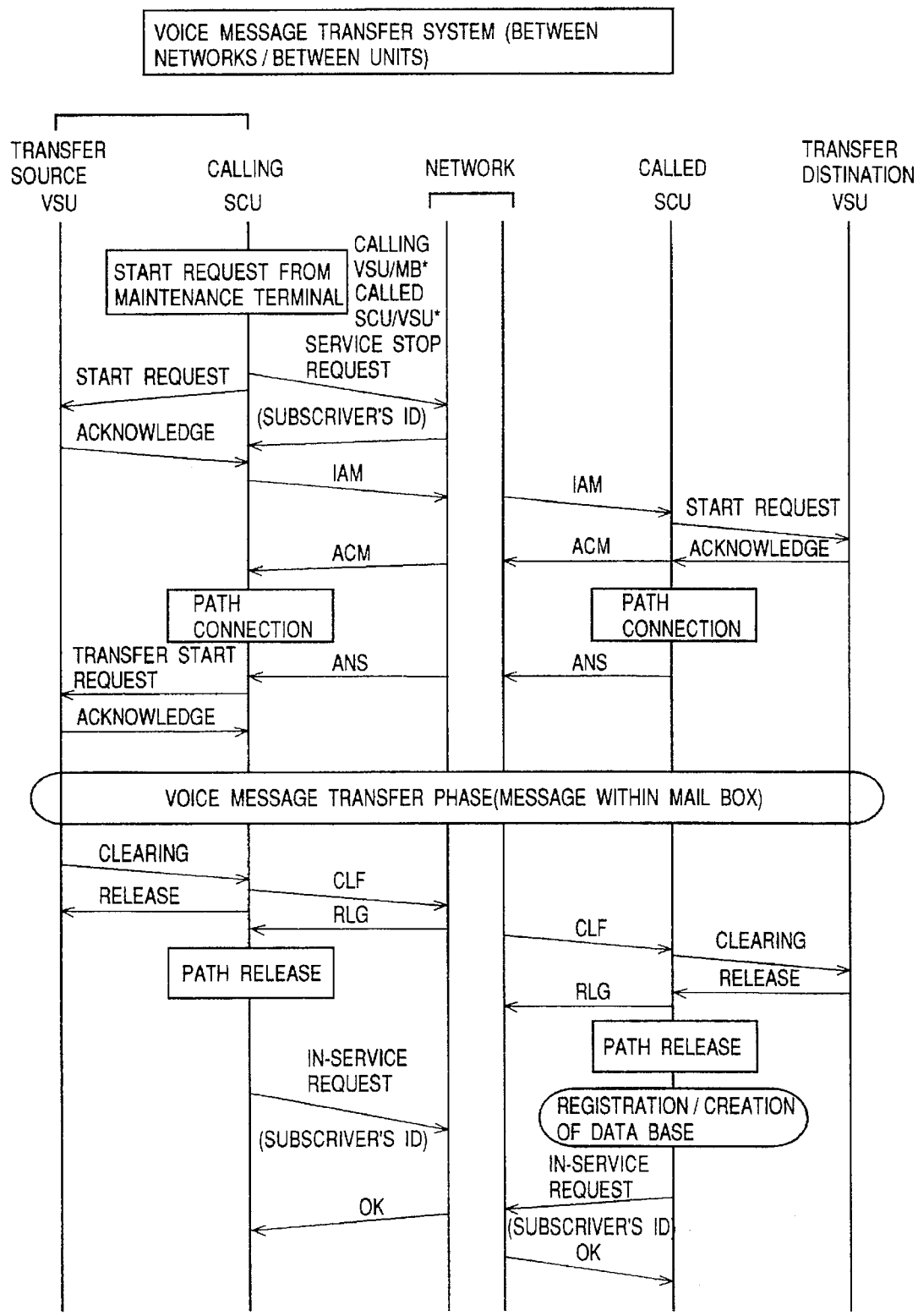
FIG. 23 is a diagram showing the sequence of a voice message transfer system.

The system control unit 11 further includes transfer means for transferring information stored in a designated one of the voice storing units 10, to another. The maintenance terminal 12 accepts the designation of the voice storing unit 10 from which the information is to be transferred, the instruction of the transfer, and the designation of the voice storing unit which is the transfer destination, whereupon it commands the system control unit 11 to transfer the information. The transfer includes that transfer operation between the voice storing units (VSU) 10 which is attendant upon a division within the identical system as shown in FIG. 15, and a transfer operation which is performed through a network as shown in FIG. 16. FIG. 23 illustrates the transfer sequence of a voice message.

Referring to each of FIGS. 15 and 16, in the transfer operation, first of all, the VSU number of the transfer destination is designated using the maintenance terminal 12, and the allocation thereof is registered in the memory or record means. Further, even the area of the voice storing unit may well be designated. Subsequently, the VSU number of the transfer source or calling unit is designated with the maintenance terminal 12. The transfer means transfers the stored information from the voice storing unit of the transfer source to that of the transfer destination. An instruction may well be given to the switch of the network before the transfer so as to stop the service of the playback of the stored message. The transfer can be started by calling out the VSU number of the transfer destination along with the ID number of the input. When the path of the message circuit has been connected, the voice message begins to be transferred.

Further, the mail box information stored in the memory means, such as the time period for which the information have been stored, the password number, and the greeting previously entered by the calling subscriber, can be transferred through the common channel. After the transfer has been acknowledged, the transferred message is erased from within the voice storing unit of the transfer source. The erasing may be effected either automatically by the transfer means or by an instruction given with the maintenance terminal 12, after the acknowledgement of the end of the transfer. After the path of the message circuit has been released, the transfer means gives a command for the restart of the playback service along with the ID number of the input. Regarding the service of storing a message, insofar as a calling subscriber is assigned to the pertinent voice storing unit, the message may well be stored by allocating another of the voice storing units during the message transfer stated above.

Figure 24:
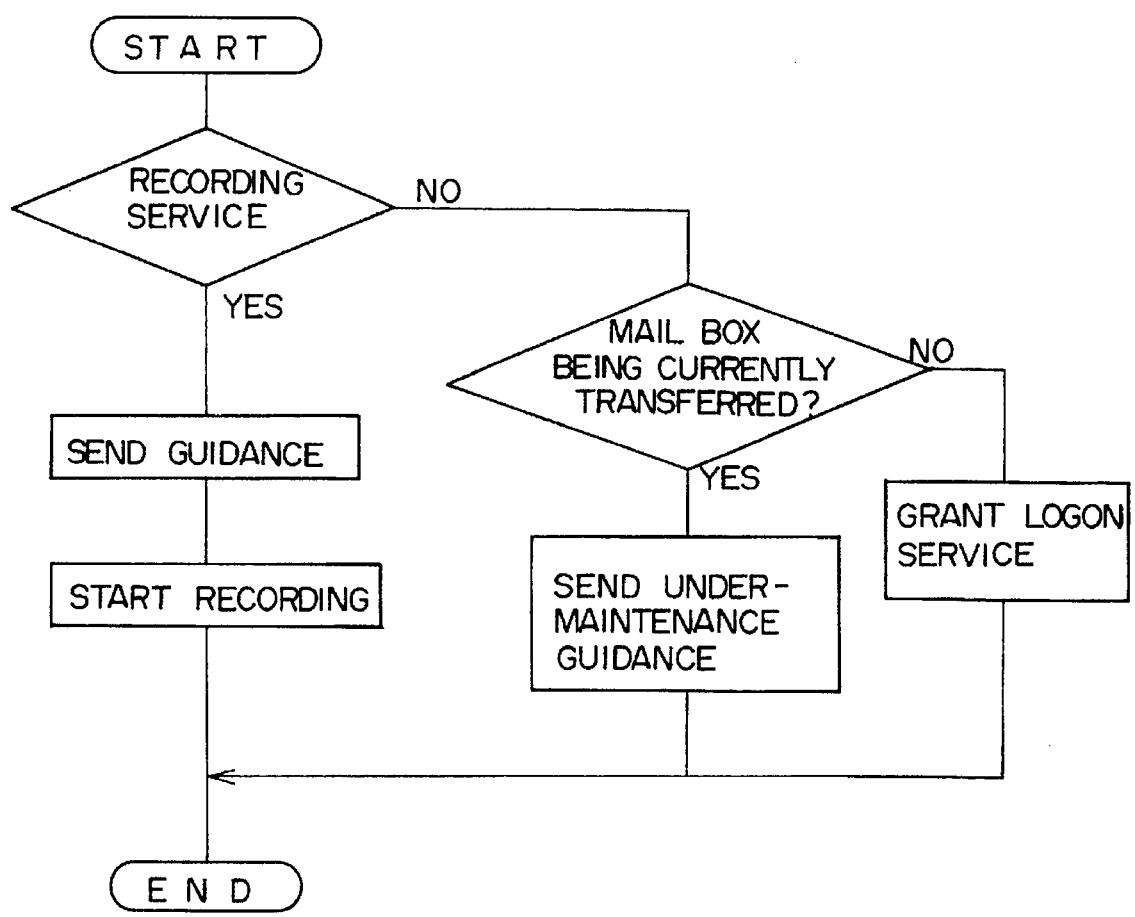
FIG. 24 is a flow chart showing a user service.

FIG. 24 is a flow chart showing a user service. When the switch or exchange of the network has been instructed to stop any service, it can deliver a preset guidance message. In this case, the message may well be transferred at the connection of the path of the message circuit after the mail box information has been transferred through the common channel in advance.

Further, the stored information in the form of the digital signal left intact may well be transferred through a digital circuit. Thus, the degradation of the signal can be presented.

Now, there will be described various services in the case where the voice storing equipment of the foregoing embodiment is connected in a switching system in which a plurality of communication circuits are accommodated and which has a switch for exchanging information among the plurality of communication circuits on the basis of destinations. FIGS. 21A and 21B and FIGS. 22A and 22B are tables for explaining the services of the voice storing system.

First, the services of transferring information to the voice storing equipment will be explained. The switch in the conventional network such as a public network is furnished with transfer means for transferring the information to the information storing equipment, in addition to devices for an ordinary switching operation. Further, an opportunity for transfer at which the information is transferred to the information storing equipment is designated beforehand, and decision means is mounted for deciding whether or not the designated opportunity of the transfer exists. At the designated opportunity of the transfer, the input information item entered into the switch is transferred to the information storing equipment instead of being switched to the destination thereof. The opportunity of the transfer can be designated as an occasion where the call of the destination is not responded to. On this occasion, the input information item is transferred to the information storing equipment so as to store a message therein. Also, the opportunity of the transfer can be designated as an occasion where the call of the destination is not responded to for a predetermined time period. Further, the opportunity of the transfer may well be designated as an occasion where the input information item indicates the voice storing equipment as a preset designation. Alternatively, the switch may well include memory means for storing therein the identification information of switching ends which correspond to the destinations, and registration means for registering the identification information in the memory means. Thus, the decision means refers to the memory means and decides an occasion where the switching end or destination of the input information item is not registered, as the opportunity of the transfer.

The operation of transfer will be explained with reference to FIG. 17. This figure illustrates the architecture of a message storing system for personal communications.

Figure 17:
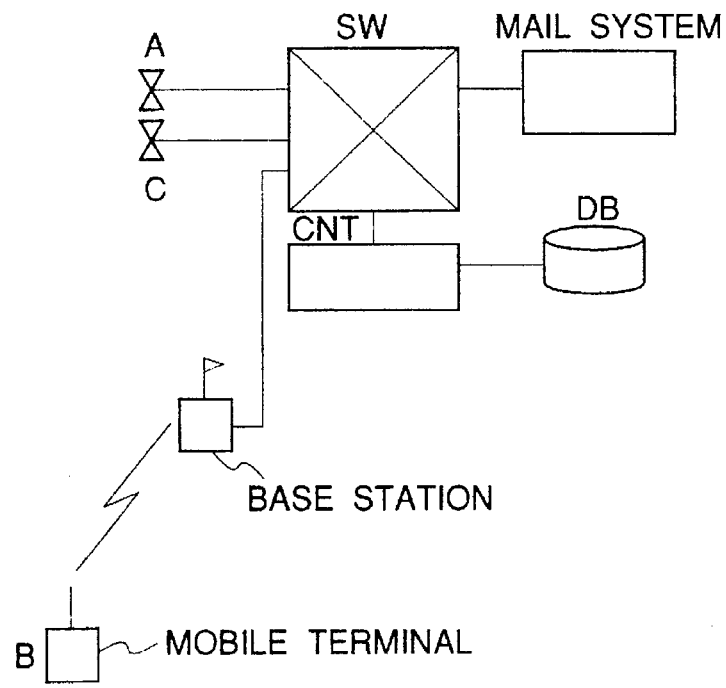
FIG. 17 is a diagram showing a message storing system in personal communications.

Referring to FIG. 17, a switch or exchange SW is a switch in a network such as a public network. The plurality of terminals of, e.g., telephony are connected to the switch SW, and a controller CNT for controlling the switch SW is also connected thereto. Further, the information storing equipment (a mail system) is connected to the switch SW. The controller CNT may well be built into the switch SW. Connected to the controller CNT is a data base DB in which ID (identification) numbers such as personal subscribers' telephone numbers assigned to personal subscribers are stored in correspondence with the terminal numbers of connection destinations. The data base DB may well be connected through a data network or a common channel signaling network. In addition, mobile terminals for radio communications can be connected to the switch SW through base stations. In the case of connecting the mobile terminals, location information indicating the positions of the mobile terminals are further stored in the data base DB. To be stored as the location information are the identification numbers of the base stations for indicating which of the base stations are managing the mobile terminals. When the switch SW has been notified of the location information by the mobile terminal, registration means included in this switch SW registers the location information in the data base DB as the identification information Of the switching destination.

Let's take as an example a case where a call for communicating from a terminal A to an opposite party of destination ID number=x is originated in the system of FIG. 17. Decision means included in the controller CNT decides whether or not the destination ID number=x is registered, with reference to the data base DB. Unless the destination ID number=x is registered in the data base DB, the transfer means of the switch SW is commanded to transfer the entered input information item to the information storing equipment. When the terminal A has been connected to the information storing equipment, the information entered from the former can be stored in the latter. If the destination ID number=x is registered as a terminal number C in the data base DB, an ordinary switching operation is so performed that the destination ID number=x is converted into the terminal number C and that the terminal A is switched and connected to the destination C. In addition, when the destination ID number=x is of a mobile subscriber B, the location information thereof is registered in the data base DB, and the calling terminal A is connected to the called terminal B via the base station. In the case where the oppotunity of the transfer is designated as the occasion where the call of the destination of the input information item is not responded to, the decision means operates to connect the terminal A to the information storing equipment on condition that the call of the terminal B or C is not responded to. Herein, the input information item may well be transferred subject to no response for a predetermined time interval.

Next, there will be explained services of presenting the reception of a message to a subscriber in a case where the message has been stored in the voice stored in the voice storing equipment (as indicated in FIGS. 21A and 21B). In this case, the switch further includes presentation means for presenting or reporting the fact that the information has been stored in the voice storing equipment. The presentation means can present the fact to one or more previously-designated destinations corresponding to the destination of entered input information items. In presenting the stored information, the presentation means may affix thereto information on the input information items. The information on the input information items can contain at least one item from among the storing area number of the storage unit, the number of an originating subscriber, the name of the originating subscriber, and a predetermined service number. The presentation means may well be so set as to present the stored information at a time designated previously. Besides, in the case where the mobile terminal is connected, the presentation means can present or report the storage of the location information to the mobile terminal when the location information of this terminal has been registered by the registration means.

Figure 18:
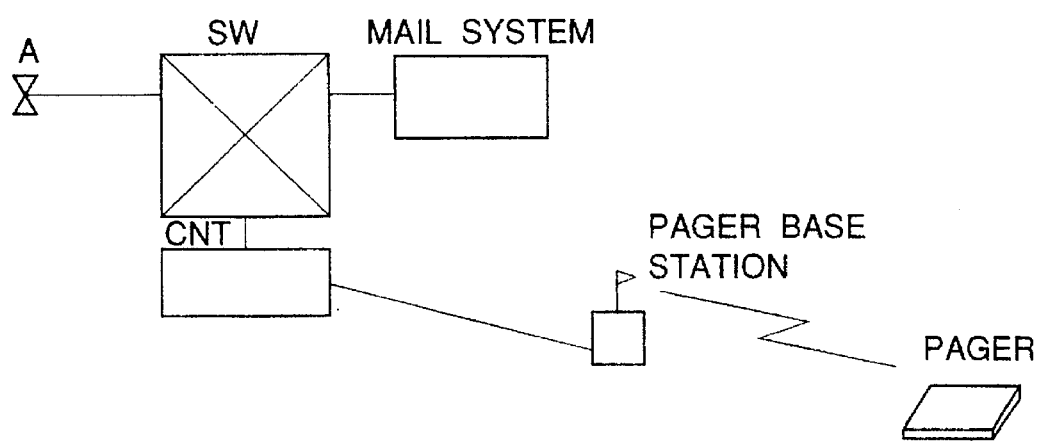
FIG. 18 is a diagram showing a message storing system which includes the function of communicating to a pager.

Methods of presenting or reporting the stored information will be explained with reference to FIGS. 18 and 19. FIG. 18 illustrates a message storing system which has the feature of presenting the message to a pager, while FIG. 19 illustrates a message storing system which has the feature of presenting the message to a mobile terminal.

Figure 19:
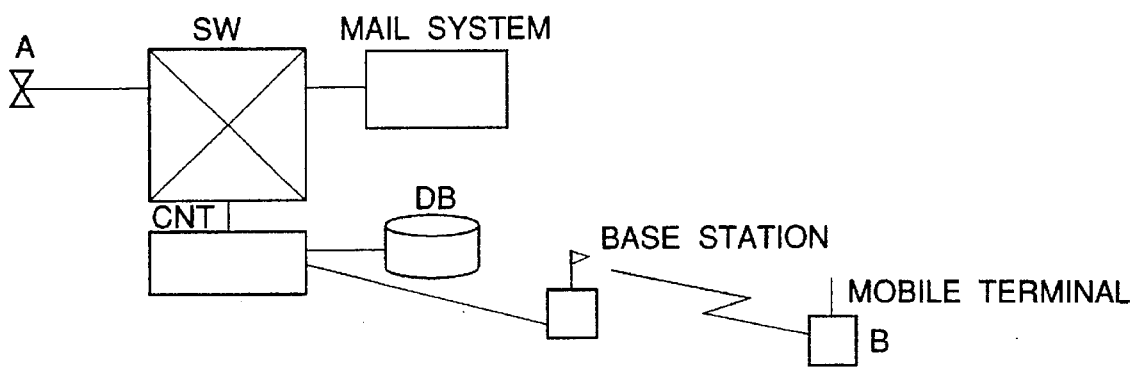
FIG. 19 is a diagram showing a message storing system which includes the function of communicating to a mobile terminal.

Referring to each of FIGS. 18 and 19, a switch SW, a controller CNT, an information storing equipment (mail system), a data base DB, a base station and the mobile terminal function similarly to those of the system shown in FIG. 17, respectively. The pager in FIG. 18 is a mobile terminal such as a bleeper, and it is connected to the switch SW through a pager base station.

In the system of FIG. 19, a terminal A is connected to the voice storing equipment instead of the mobile subscriber B, and the message directed from the terminal A to the subscriber B is transferred to and is stored in the voice storing equipment. When the message has been transferred to the voice storing equipment, the controller CNT of the switch SW controls the presentation means so as to present or report the message to at least one destination which is previously designated in correspondence with the subscriber B. As to the destination previously designated, the telephone number of the pager terminal such as a bleeper, for example, is set in the area of the subscriber B within the data base DB. In the case where the message has been transferred to the voice storing equipment, it is presented or reported to the set pager terminal by the presentation means as illustrated in FIG. 18. Besides, in the case of calling the pager terminal, the storing area number of the stored message in the storage unit, the number of the originating subscriber, the name of the originating subscriber, a predetermined service number for calling the voice storing equipment, etc. may well be also presented to and displayed on the pager terminal as information on the input information items. Further, in a case where the presentation of the message is designated to be carried out at a predetermined time period after the transfer to the voice storing equipment, the message is presented upon the lapse of the predetermined time period.

In the case of communicating with the mobile terminal through the base station as illustrated in FIG. 19, when the mobile terminal has notified its location information, the registration means registers the location information. Besides, if a message for the pertinent mobile terminal is stored in the voice storing equipment, the presentation means presents the storage of the information to this mobile terminal.

Figure 20:
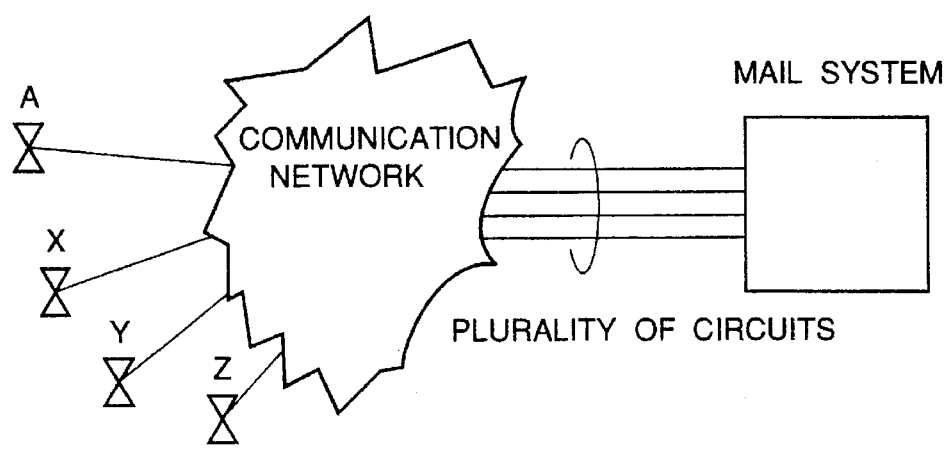
FIG. 20 is a diagram showing a broadcast communication service.

Next, a broadcast mail service which utilizes the presentation means will be explained. FIG. 20 is a diagram for explaining the broadcast mail service. The broadcast communication service can be realized by designating the presentation to at least two destinations at a specified time beforehand. As, for example, a morning call service or a communication network service, a message is stored, and it is simultaneously presented or reported to the designated destinations at the designated time. In this case, the presentation means may well be installed in the voice storing equipment.

Referring to FIG. 20, a subscriber A stores a message in the voice storing equipment (mail system) and registers a plurality of destinations X, Y and Z as well as a delivery time T in a data base. When the set time T has been reached, the presentation means presents the message to the plurality of destinations X, Y and Z in parallel through a plurality of circuits. Thus, the message can be broadcast, and it is not necessary to store a plurality of messages. Such an application is also possible that all the attendants of a meeting are prompted to gather 5 minutes before the beginning of the meeting.

Further, the system may well be so operated that destinations are sampled at random, that the voice storing equipment is connected to the sampled destinations so as to send the message thereto, and that signals or messages are received from the terminals of the connected destinations. In the voice storing equipment, the responsive signals or messages may well be totalized.

As thus far described, the various services can be offered by utilizing the voice storing equipment.

According to the embodiment, the storage units of large capacity can be installed, and the load of the system can be distributed by connecting the voice storing equipment to the switch and allocating the storage units fixedly. Besides, due to the transfer through the network such as a public network, service continuities are ensured against office condition alterations such as the extension work. Moreover, the various services can be offered by installing the switch and the voice storing equipment.

According to the present invention, entered calls have their output routes determined automatically in fixed fashion and are then switched.

What is claimed is:

1. A switching system comprising:
an exchange for switching a call based on information identifying destination terminals; and
a voice storing equipment;
wherein said exchange includes:
means for switching said call to a destination terminal of the call;
means for calling the destination terminal of said call;
means for judging whether or not said destination terminal responds when said calling means calls a destination terminal;
means for transferring said call to said voice storing equipment when said means for judging that said destination terminal does not respond to said means for calling;
wherein said voice storing equipment includes:
a plurality of storage units for storing voice transmitted from an original terminal of said call, said storage units including first storage units which are initially provided and second storage units which are provided while said switching system is in operation after said first storage units have been provided; and
a control unit for controlling a connection between said exchange and said plurality of storage units;
wherein said control unit includes:
means for detecting information identifying said destination terminal of said call when said call is transferred by said transfer means;

means for recording a corresponding relationship between the identification information of said destination terminal and one of the storage units;

means for performing an allocation of one of said plurality of storage units to the identification information in accordance with contents of the identification information detected by said identification information detection means and recording the corresponding relationship between the identification information and the storage unit allocated thereto, when the corresponding relationship as to the identification information is not recorded in said recording means;

output means for outputting said call to one of the storage units in accordance with the relationship recorded in said recording means for the identification information detected by said means for detecting information identifying the destination terminals;

means for detecting said second storage units when the second storage units are provided; and indication means for indicating whether or not said second storage units are provided in accordance with detection by said means for detecting;

wherein when said indicating means indicates that said second storage units are provided, said means for performing an allocation allocates the one of the detected second storage units to said identification information in accordance with contents of the identification information in preference to said first storage units.

2. The switching system of claim 1, wherein said indicating means indicates that said second storage units are not provided when the second storage units have been allocated a predetermined number of times.

3. A switching system comprising:

an exchange for switching a call based on identification information of a destination mobile terminal; and voice storing equipment;

wherein said exchange includes:

switching means for switching said call to the destination mobile terminal of the call;

memory means in which location information indicating a position of the destination mobile terminal is stored;

means for registering said location information in said memory means;

judgment means for judging whether or not said location information of said destination mobile terminal is registered in said memory means; and transfer means for transferring said call to said voice storing equipment when said judgment means judges that said location information of said destination mobile terminal is not stored in said memory means.

4. A switching system according to claim 3, wherein said voice storing equipment includes a plurality of storage units storing voice information transmitted from an original terminal of said call, and said storage units which store said call are determined in accordance with contents of identification information of said destination mobile terminal.

* * * * *

UNITED STATES PATENT AND TRADEMARK OFFICE
CERTIFICATE OF CORRECTION

PATENT NO. : 5,652,576
DATED : July 29, 1997
INVENTOR(S) : Yoshikatsu Inokuma et al It is certified that error appears in the above-identified patent and that said Letters Patent is hereby corrected as shown below:

Column 2, line 6, Before "each" delete "the".

Signed and Sealed this

Third Day of February, 1998

BRUCE LEHMAN

*Attest:*

*Attesting Officer*   *Commissioner of Patents and Trademarks*